United States Patent
Tanaka et al.

(10) Patent No.: US 6,522,606 B1
(45) Date of Patent: *Feb. 18, 2003

(54) OPTICAL PICKUP SERVO CONTROL APPARATUS WITH STORED COMPENSATORY VALUES

(75) Inventors: Shigeyoshi Tanaka, Kawasaki (JP); Toru Ikeda, Kawasaki (JP); Shigenori Yanagi, Kawasaki (JP); Takashi Masaki, Kawasaki (JP)

(73) Assignee: Fujitsu Limited, Kawasaki (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/419,512

(22) Filed: Apr. 7, 1995

Related U.S. Application Data

(63) Continuation of application No. 08/022,081, filed on Feb. 24, 1993, now abandoned.

(30) Foreign Application Priority Data

Feb. 27, 1992 (JP) .............................. 4-041222
Feb. 27, 1992 (JP) .............................. 4-041223

(51) Int. Cl.⁷ .................................................. G11B 7/00
(52) U.S. Cl. .............................. 369/44.36; 369/44.29; 369/44.35
(58) Field of Search ........................... 369/44.11, 44.25, 369/44.28, 44.29, 44.34, 44.35, 44.36, 54

(56) References Cited

U.S. PATENT DOCUMENTS

| | | | | |
|---|---|---|---|---|
| 4,707,648 A | * | 11/1987 | Minami | 369/44.35 |
| 4,907,212 A | * | 3/1990 | Pharris et al. | 369/44.26 |
| 4,942,564 A | * | 7/1990 | Hofer et al. | 369/44.35 |
| 5,048,002 A | * | 9/1991 | Horie et al. | 369/44.36 |
| 5,097,458 A | * | 3/1992 | Suzuki | 369/44.29 |
| 5,113,384 A | * | 5/1992 | McDonald et al. | 369/44.28 |
| 5,164,932 A | * | 11/1992 | Fennema et al. | 369/44.29 |
| 5,251,194 A | * | 10/1993 | Yoshimoto et al. | 369/44.29 X |
| 5,481,526 A | | 1/1996 | Nagata et al. | |

FOREIGN PATENT DOCUMENTS

| | | |
|---|---|---|
| EP | 0349439 | 3/1990 |
| JP | 59-002235 | 1/1984 |
| JP | 62141644 | 6/1987 |
| JP | 62222438 | 9/1987 |
| JP | 63224034 | 9/1988 |
| JP | 1125733 | 5/1989 |
| JP | 2294940 | 12/1990 |
| JP | 3 30123 | 2/1991 |
| JP | 3-120621 | 5/1991 |
| JP | 3152722 | 6/1991 |
| JP | 3-260916 | 11/1991 |
| JP | 419833 | 1/1992 |

* cited by examiner

Primary Examiner—Thang V. Tran
(74) Attorney, Agent, or Firm—Greer, Burns, & Crain, Ltd.

(57) ABSTRACT

A servo control apparatus of an optical pickup in which an offset and a gain can be adjustable for each servo control apparatus, and influences caused by changes in environmental conditions and changes with time are reduced without a decrease in operational speed, and increase in size and an increase in cost is disclosed. The servo control apparatus includes a nonvolatile memory for storing compensatory values which correspond to differences of servo characteristics of each servo apparatus and which are measured with the assistance of external measurement instruments, and a compensation portion for compensating an optical pick-up servo signal according to the compensatory values stored in the nonvolatile memory.

6 Claims, 20 Drawing Sheets

OPTICAL PICKUP SERVO CONTROL APPARATUS WITH STORED COMPENSATORY VALUES

This is a continuation of application Ser. No. 08/022,081, filed Feb. 24, 1993, now abandoned.

BACKGROUND OF THE INVENTION

1. Field of the Invention

The present invention relates to an optical pickup servo control apparatus for forcing an optical pickup to track a medium, on which information is recorded, in an optical disk unit, an optical card reader, or the like while retaining a specified positional relationship. More particularly, the present invention relates to a servo control apparatus capable of adjusting, for each optical pickup, the individual differences in characteristics of a servo control apparatus resulting from individual errors in optical pickups caused during manufacturing.

2. Description of the Related Art

An apparatus using an optical pickup includes an optical disk unit and an optical card reader. Hereafter, the present invention will be described using the optical disk unit as an example.

In an optical disk unit, an optical disk is rotated about a rotation axis by a spindle motor. This causes an optical pickup to move in the radial direction of the optical disk and align with the optical disk. Then, the optical pickup reads or writes information from or on the optical disk.

The optical pickup routes a light beam generated by a semiconductor laser serving as a light source to an objective lens via a known optical system. Then, the objective lens shrinks the light beam to provide a spotlight of a very small diameter, and irradiates the spotlight onto the optical disk. Then, the light reflected from the optical disk is routed to the optical system via the objective lens. Consequently, a light receiver in the optical system provides a light received signal associated with a change in the reflected light.

In this kind of optical disk unit, numerous tracks and pits are formed at intervals of several microns in the radial direction of an optical disk. To record or read information on or from the optical disk, a light beam must be forced to follow a track or pits while the state of focusing providing a beam spot of 1 micron or less in diameter is being retained. However, an optical disk may become eccentric or swell. Slight eccentricity of an optical disk displaces a focusing position of a light beam, and swelling thereof deviates a focal point of a beam spot. Therefore, the beam spot cannot be irradiated onto a track of the optical disks as it is. To solve this problem, a servo control apparatus is used to perform servo control so that an optical pickup will move on a track or pits while maintaining the focal point providing a beam spot of 1 $\mu$m or less. Specifically, a servo control apparatus for an optical pickup performs two kinds of servo control; that is, focus servo control for controlling a focal point of a light beam and tracking control for moving a beam spot to follow a track or pits.

In efforts to achieve the foregoing servo control, a focus actuator (focus coil) for moving an objective lens of an optical pickup perpendicularly to an optical disk in order to vary a focal point, and a tracking actuator (track coil) for moving the objective lens in the radial direction of the optical disk in order to vary an irradiation point in the tracking direction are provided. An optical system includes, for example, four elements making up a four-division light receiver, and is designed to provide a focus error signal FES associated with a deviation of the focal point of a beam spot and a tracking error signal TES associated with a displacement of the beam spot from a tracing position by processing the outputs of these elements. A focus servo control or a component of a servo control apparatus for an optical pickup processes a light received signal output by the light receiver, generates a focus error signal, and feeds back the focus error signal to the focus actuator so as to control the focus actuator. A tracking servo control processes the light received signal, generates a tracking error signal, and feeds back the tracking error signal to the tracking actuator so as to control the tracking actuator.

In the foregoing focus servo control or tracking servo control, an offset occurs due to individual variations in characteristics of each part of the optical pickup or to an error in mounting each part. Therefore, the focus does not always coincide with a recording surface of an optical disk when a focus error signal has a zero level. For a similar reason, the gain of the servo control system varies. Therefore, the focus servo control and tracking servo control are required to control their offsets and gains for each optical pickup.

In an optical pickup servo control apparatus, differential amplifiers are employed as means that use a light received signal to generate a focus error signal and a tracking error signal respectively. In the past, a bias resistor and a feedback resistor connected to these differential amplifiers have been realized with variable resistors, or a variable resistor has been connected to an offset control terminal. Thus, offsets and gains have been controlled. Furthermore, the variable resistors are adjusted in a process of manufacturing an optical pickup so that offsets will be zero and gains will be specified values.

However, a resistance of a variable resistor having a sliding portion tends to vary due to an environmental change or over time. Therefore, an offset and a gain, which have already been controlled, may vary as environments change or time passes. This results in unsatisfactory servo control.

In efforts to solve the aforesaid problems, the present applicant has disclosed an apparatus in Japanese Unexamined Patent Publication (Kokai) No. 62-222438 and Japanese Unexamined Patent Publication (Kokai) No. 62-141644. In the disclosed apparatus, a detector for detecting an offset value and a compensating means that compensates for the detected offset value are included in the focus servo control and in the tracking servo control respectively in an optical pickup, whereby an offset is automatically controlled. Japanese Unexamined Patent Publications (Kokai) Nos. 1-125733, 2-294940, 3-152722 and 4-19833 also disclose similar apparatuses each having a detector for detecting an offset value and a compensating means that compensates for the detected offset value.

The aforesaid kind of servo control apparatus is unsusceptible to an environmental change or a time-sequential change because no variable resistor is used. However, the servo control apparatus poses the following problems:

(1) Since a focus servo system or a tracking servo system is adjusted during normal operation of an optical disk unit, the normal operation is slowed down by time required for adjustment.

(2) For automatic adjustment, a peak detector (envelope detector), an A/D converter, and other extra circuits are needed. This leads to an increase in the scale of circuitry. Eventually, the optical disk unit becomes larger and costs increase.

When it comes to gain control, in Japanese Unexamined Patent Publication (Kokai) No. 63-224034, the present applicant has disclosed a technology allowing the tracking servo control to perform gain control in such a manner that permits stable servo control irrelevant of a change in the shape of a track groove. This technology can control only a gain variation resulting from the shape of a groove on an optical disk. The technology, therefore, does not cope with variations in servo gain resulting from other factors, such as, performance of an actuator, and assembly precision of an optical system.

The aforesaid prior art has not dealt with control of a focus servo gain.

For the reasons mentioned above, gain control is currently achieved using a variable resistor.

When a variable resistor is used to control an offset and a gain occurring in a servo control apparatus for an optical pickup, a controlled state is subject to change. This disables stable servo control. When an offset value detector is installed in the apparatus to compensate for an offset, the operating speed decreases, the size expands, and the cost increases.

SUMMARY OF THE INVENTION

An object of the present invention is to realize a servo control apparatus of an optical pickup in which an offset and a gain can be adjustable for each servo control apparatus, and influences from changes in environmental conditions and changes with the passage of time are reduced without a drop in operation speed, an increase in size and an increase in cost.

A servo control apparatus of an optical pickup according to the present invention includes a nonvolatile memory and a compensation portion. The nonvolatile memory stores compensatory values corresponding to differences of servo characteristics of each servo control apparatus, and these compensatory values of servo characteristics are measured with the assistance of external measurement instruments when this servo control apparatus is manufactured at a factory and so forth. The compensation portion compensates an optical pickup servo signal according to the compensatory values stored in the nonvolatile memory.

A servo control apparatus of an optical pickup according to the present invention is a focus servo control apparatus or a tracking servo control apparatus, or includes these two focus and tracking servo apparatuses.

Compensatory values of offset and gain of servo characteristics are stored in the nonvolatile memory. If a compensatory value of the gain is stored in the nonvolatile memory, the compensation portion includes a gain adjustable amplifier. If a compensatory value of the offset is stored in the nonvolatile memory, the compensation portion includes a summing circuit.

A compensatory value setting method of a servo control apparatus according to the present invention includes a step for measuring a signal of a portion of said servo control apparatus by external measurement means, a step for changing a compensatory values until said signal of said portion reaches a predetermined condition, and a step for storing said compensatory values into said nonvolatile memory.

BRIEF DESCRIPTION OF THE DRAWINGS

The present invention will be more clearly understood from the description as set forth below with reference to the accompanying drawings, wherein.

DESCRIPTION OF THE PREFERRED EMBODIMENTS

As described previously, the servo control for an optical pickup requires two kinds of control; focus servo control and tracking servo control. Each control is accompanied by offset and gain control. The present invention can be implemented not only in either one of the above controls, for example, in offset control as part of focus servo control, but also in all the above controls simultaneously.

First of all, embodiments in which the present invention is implemented in offset control as part of focus servo control and tracking servo control for an optical pickup in an optical disk unit will be described as the first to third embodiments.

Figure 1:
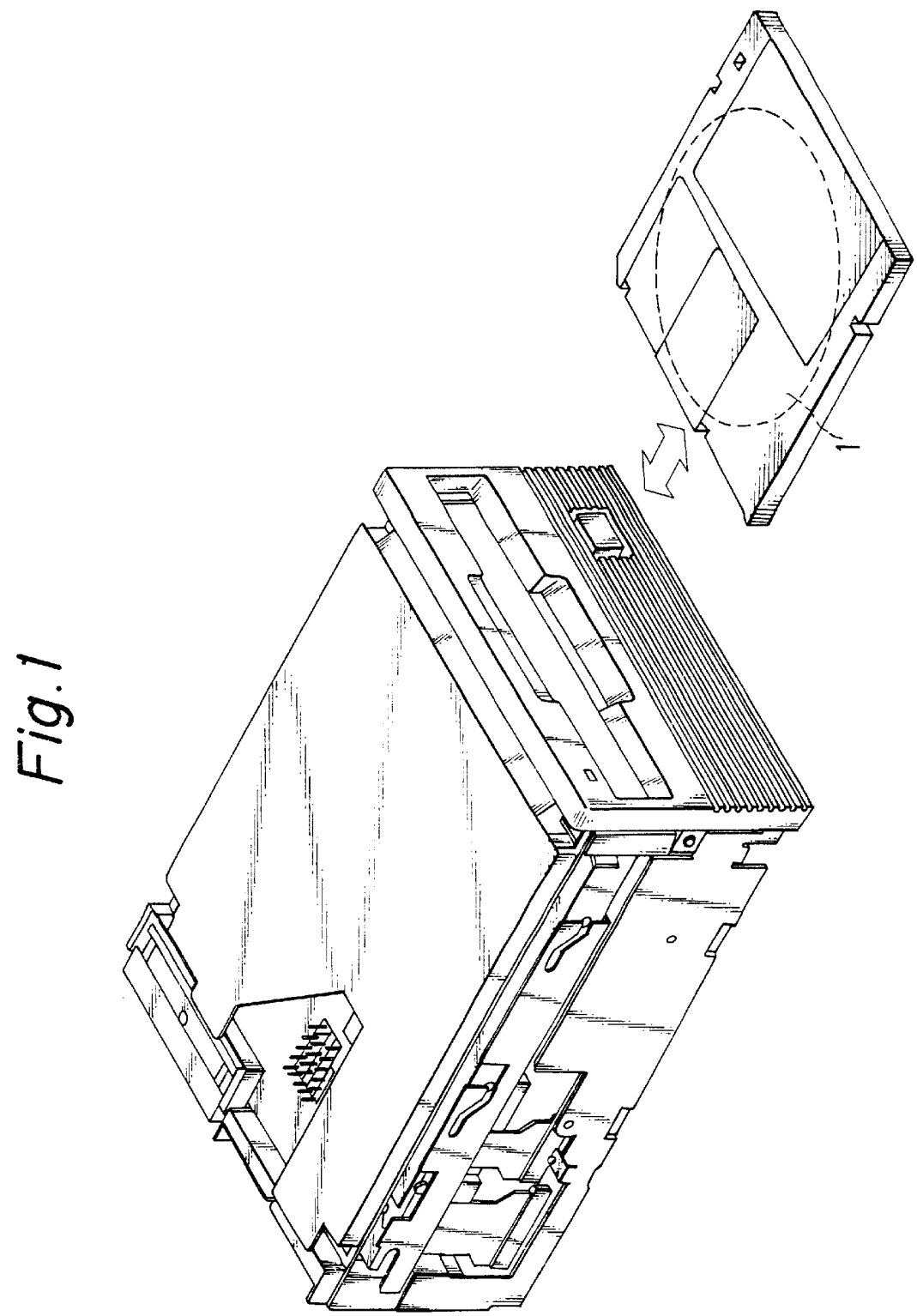
FIG. 1 is a diagram showing an appearance of a common optical disk apparatus.

FIG. 1 shows an appearance of an optical disk unit of these embodiments. An optical disk 1 is inserted or ejected in directions shown by a double arrow. In an optical disk, which is used as an external memory for information equipment, a storage capacity and an operating speed have significant meanings. This makes it necessary to adjust an optical pickup servo control apparatus with high precision.

Figure 2:
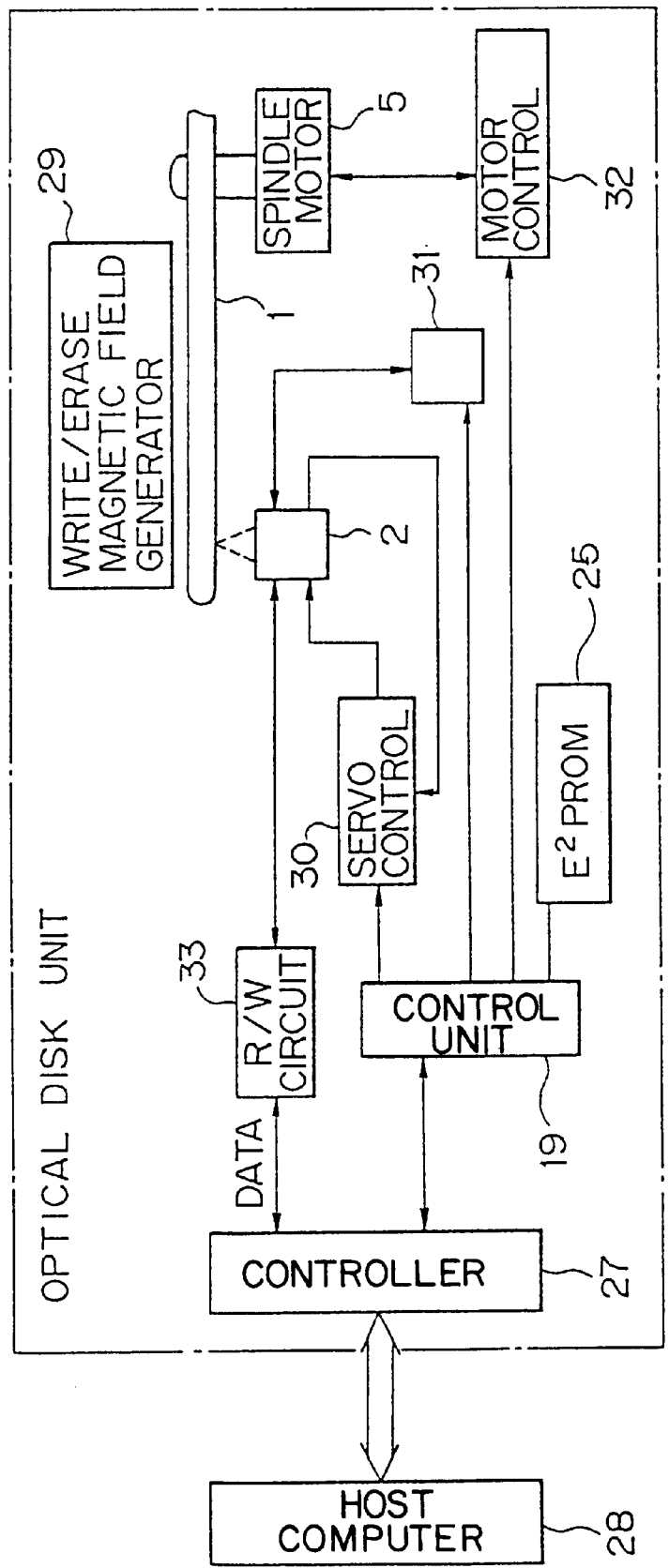
FIG. 2 is a diagram showing a construction of a common optical disk apparatus.
Figure 3:
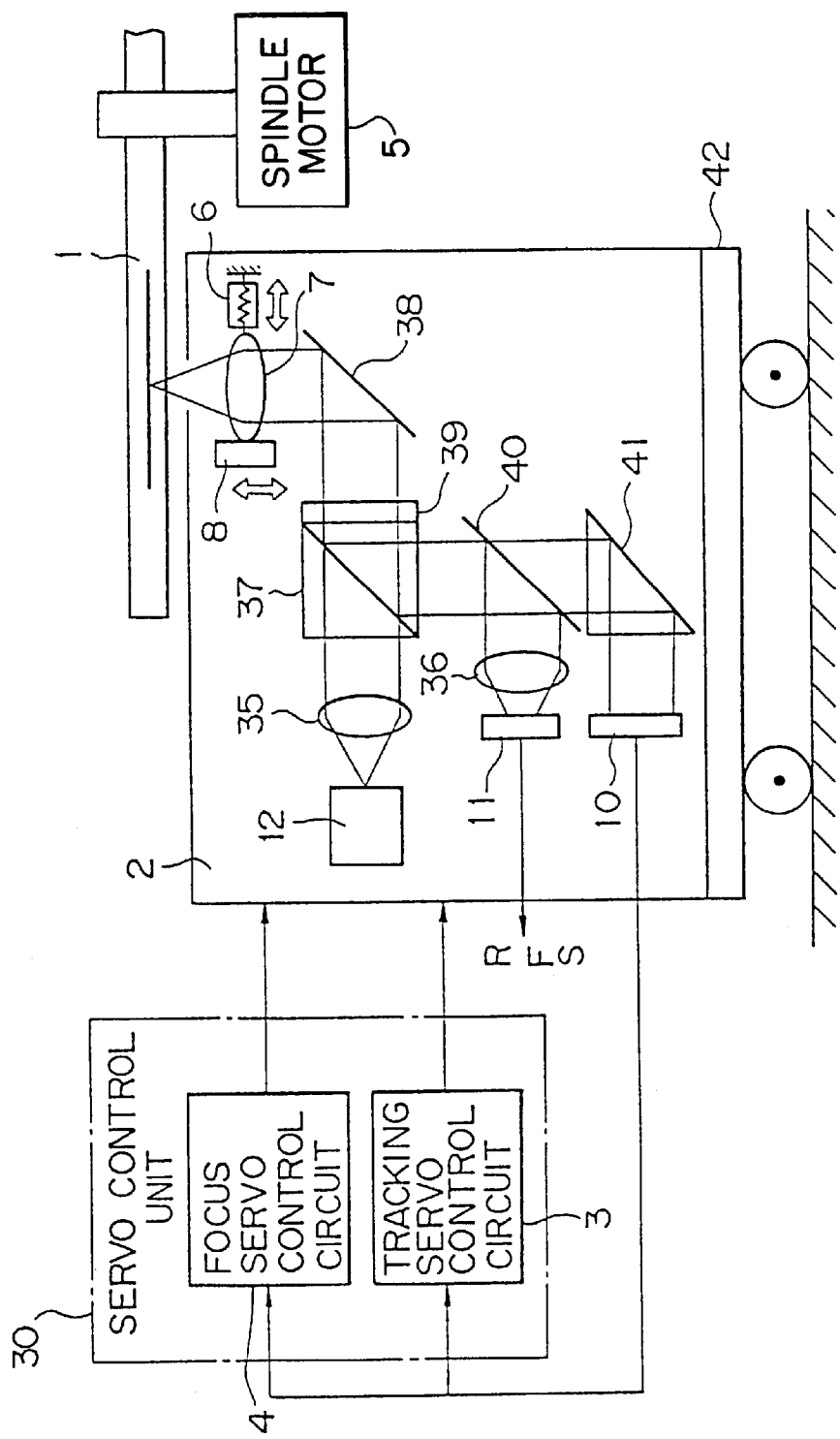
FIG. 3 is a diagram showing a construction of a common optical pickup and a servo control portion.
Figure 4:
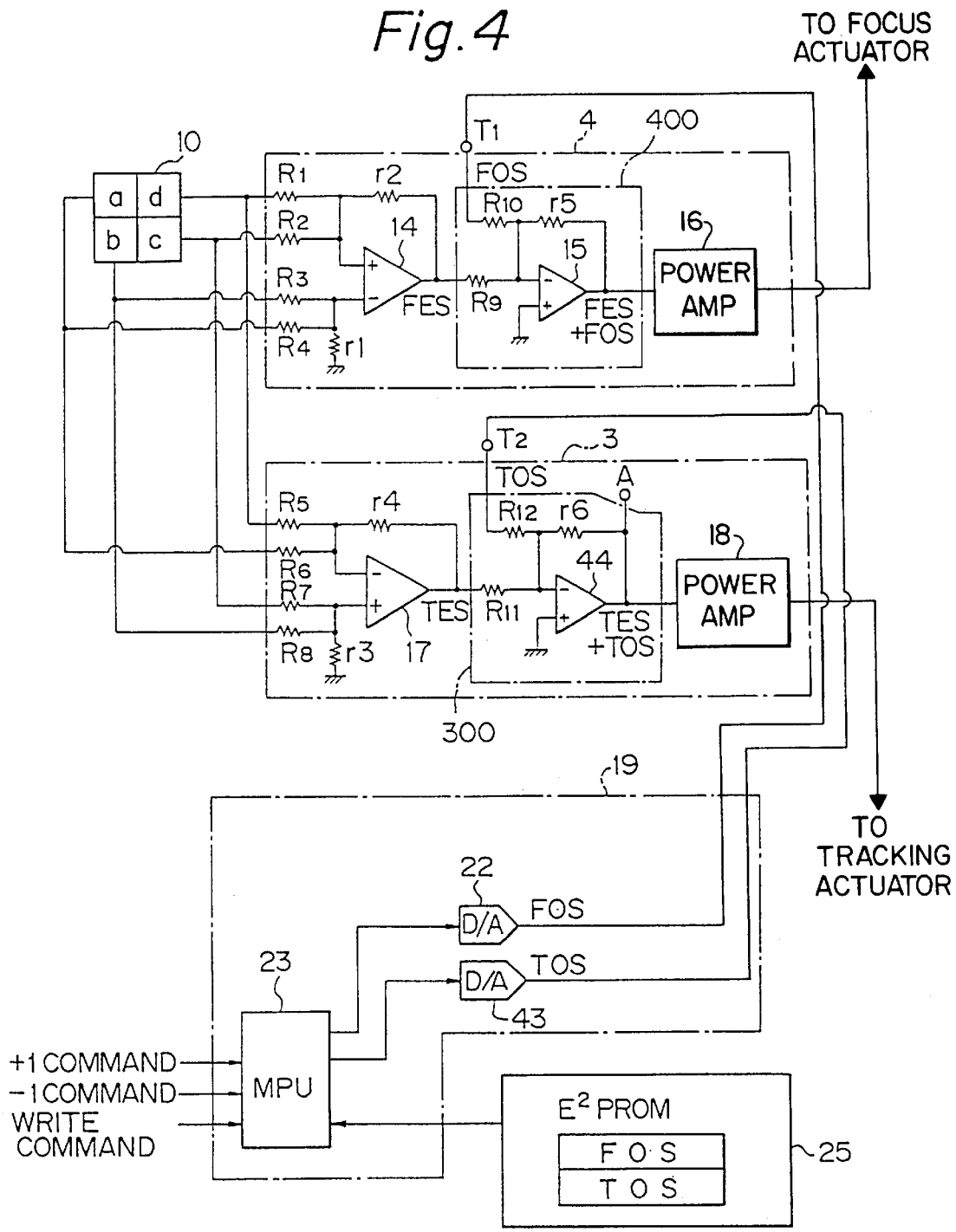
FIG. 4 is a diagram showing a construction of a servo control portion and a control portion according to first to third embodiments of the present invention.
Figure 5:
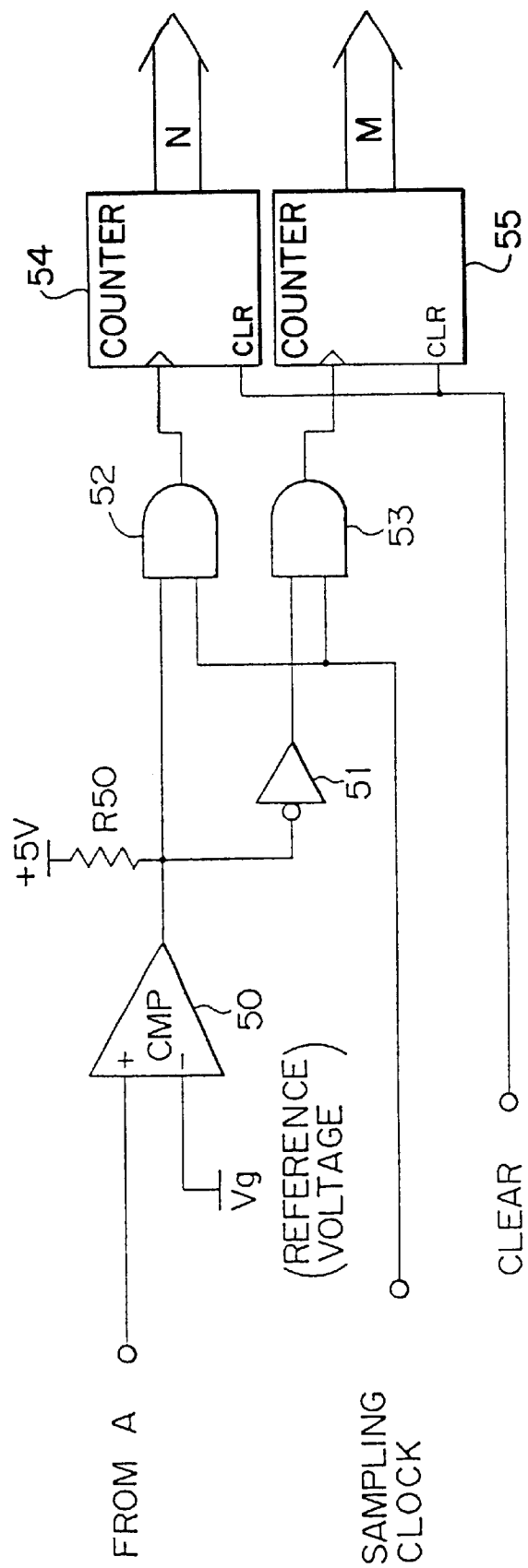
FIG. 5 is a circuit diagram of a duty measurement circuit used in the second embodiment.
Figure 12:
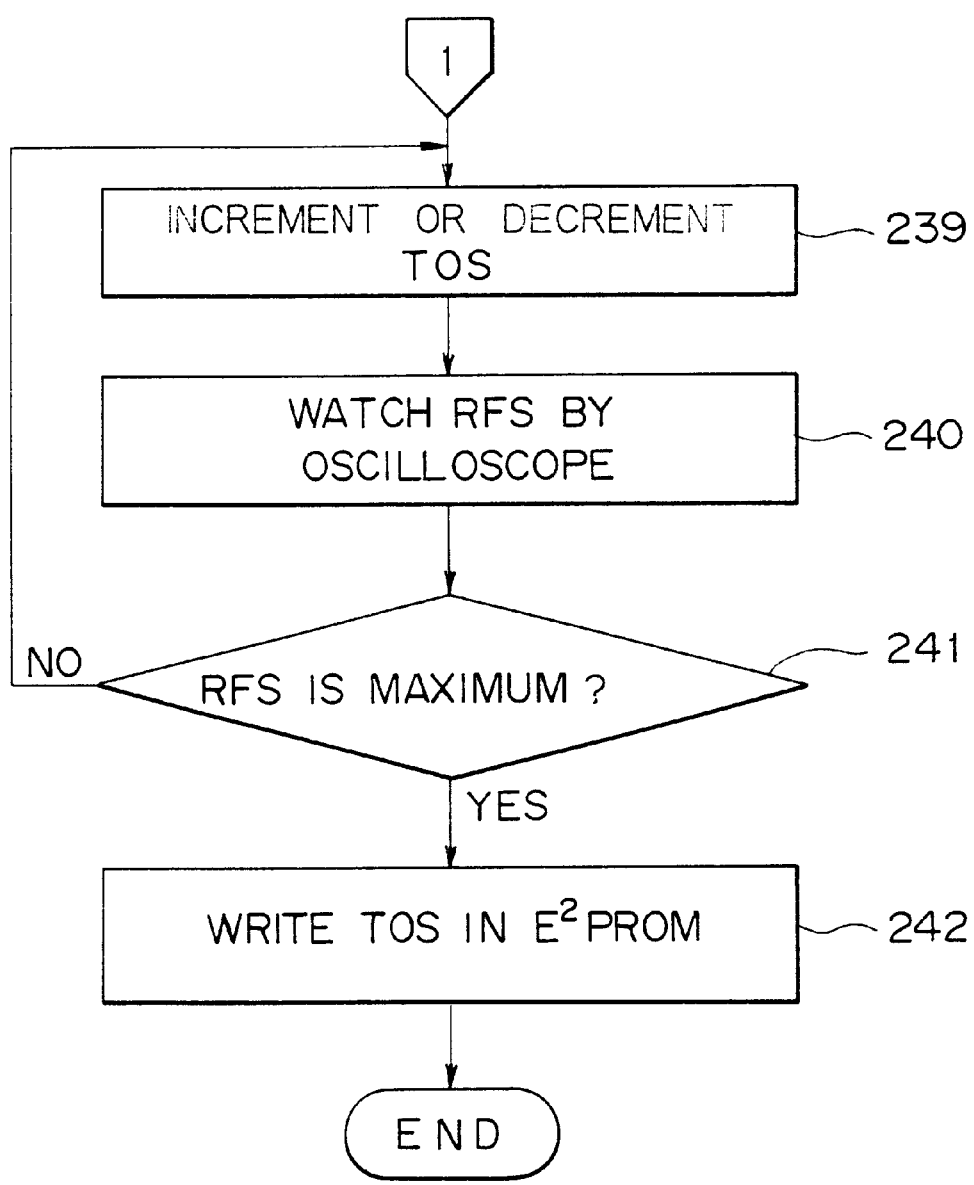
Figure 13:
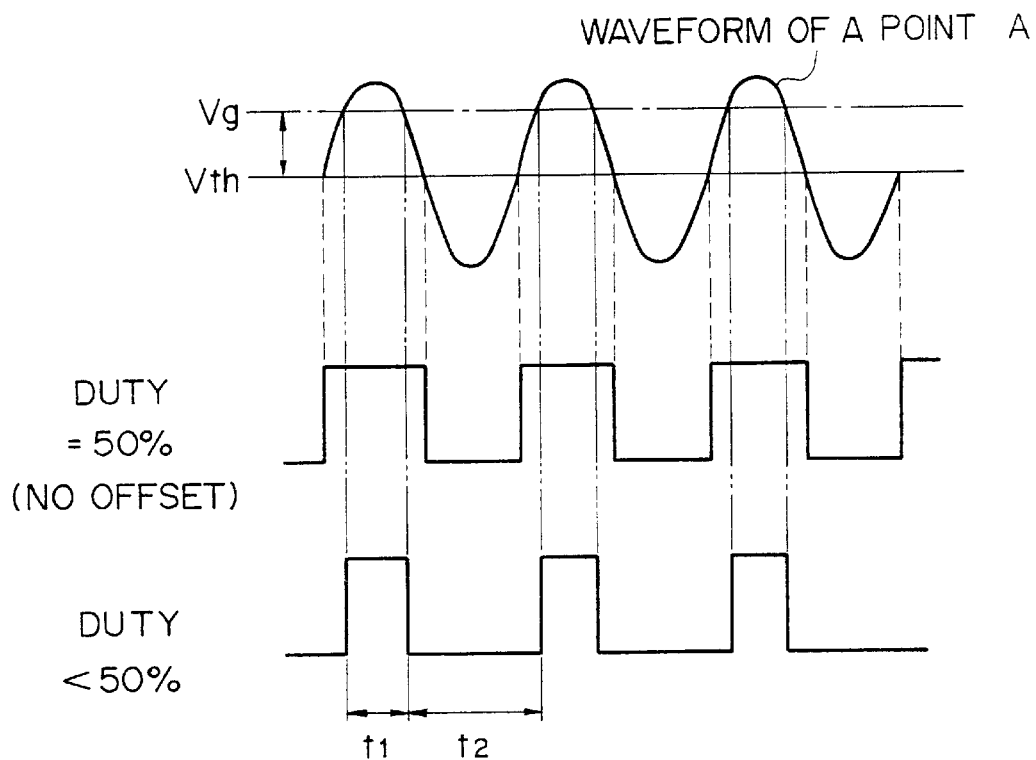
FIG. 13 is a diagram illustrating a offset measuring method by detecting a duty ratio of signal.
Figure 14:
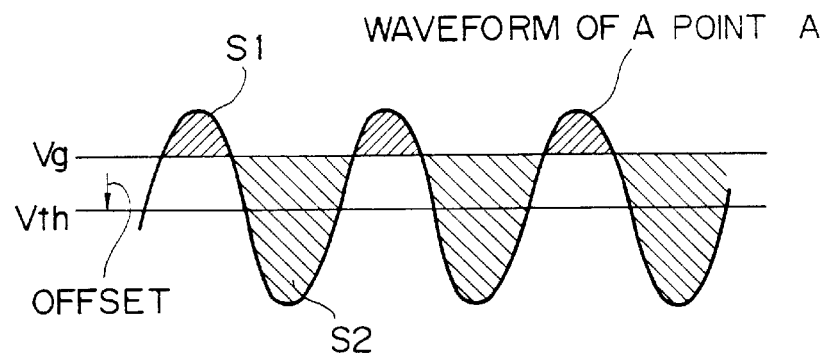
FIG. 14 is a diagram illustrating a offset measuring method by detecting a ratio of a positive area and a negative area in relation to a reference level.
Figure 15:
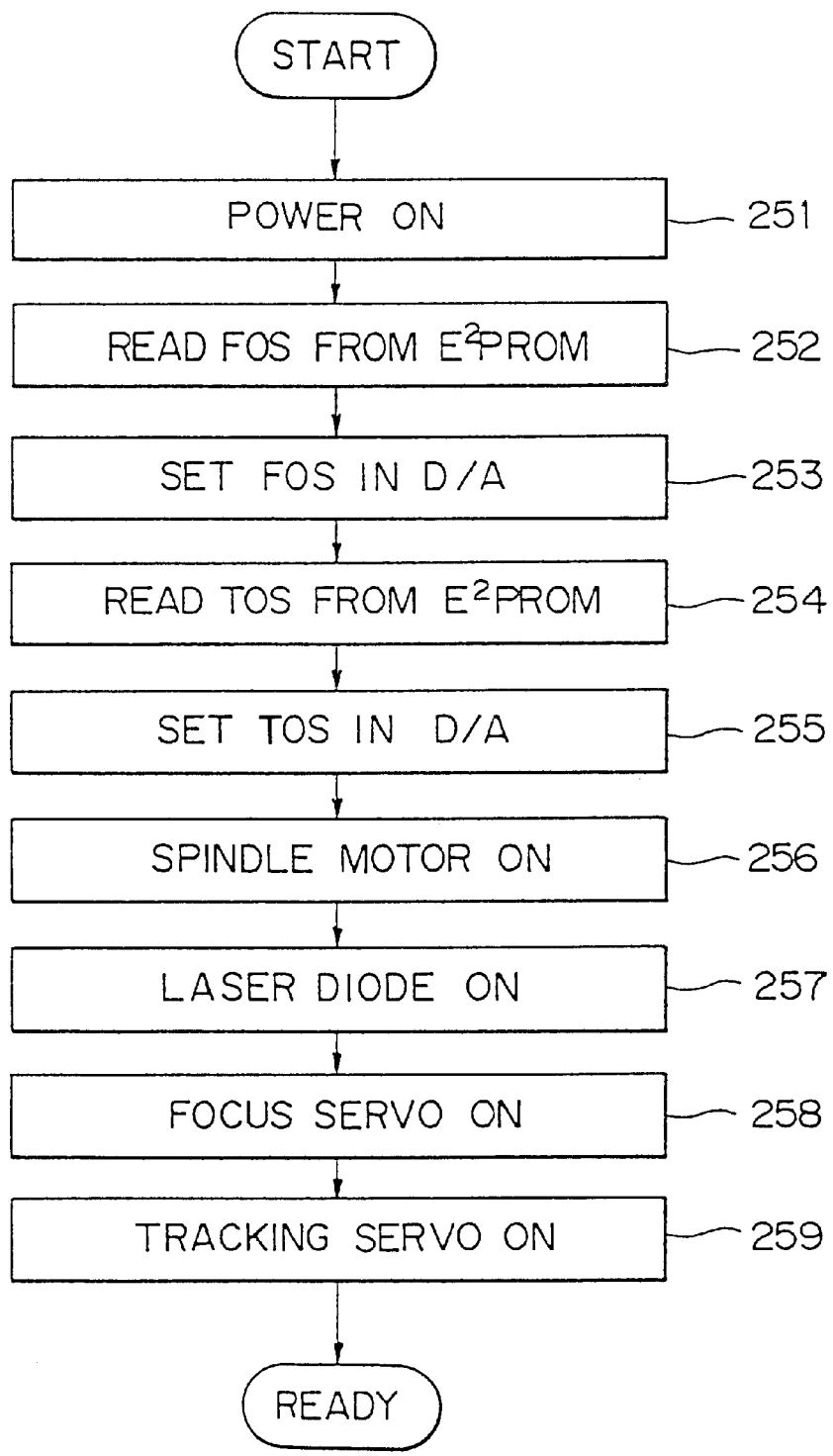
FIG. 15 is a flowchart showing an operation for setting the offset values stored in an $E^2PROM$ in the servo control portion when this apparatus is powered ON in the first to third embodiments.

FIGS. 2 to 15 show the first to third embodiments. FIG. 2 shows an example of a configuration of an optical disk unit. FIG. 3 shows a configuration of an optical pickup and a servo control unit. FIG. 4 shows examples of configurations of a servo control unit and a control unit. FIG. 5 shows an example of a duty measurement circuit. FIGS. 6A to 6E are explanatory diagrams of focus servo control. FIGS. 7A to 7E are explanatory diagrams of tracking servo control. FIGS. 8 to 12 are flowcharts of the process for adjustment at a factory. FIG. 13 is an explanatory diagram of an offset detection method by detecting a duty rate. FIG. 14 is an explanatory diagram of an offset detection method by averaging positive and negative portions. FIG. 15 is a flowchart of the process for normal operation.

In the drawings, 1 denotes an optical disk. 2 denotes an optical pickup, 3 denotes a-tracking servo control circuit, 4 denotes a focus servo control circuit, 5 denotes a spindle motor, 6 denotes a tracking actuator, 7 denotes an objective lens, 8 denotes a focus actuator, 10 denotes a four-division light receiver, 11 denotes a light receiver, 12 denotes a light source (semiconductor laser), 14 and 17 denote differential amplifiers, 15 denotes an addition amplifier, 16 and 18 denote power amplifiers, R1 to R10, and r1 to r4 denote resistors, 19 denotes a control unit, 22 denotes a digital-analog converter (hereafter, D/A converter), 23 denotes a microprocessor (MPU), 25 denotes an $E^2PROM$ (electrically rewritable ROM), 27 denotes a controller, 28 denotes a host, 29 denotes a magnetic field generator, 30 denotes a servo control, 31 denotes a light value control, 32 denotes a spindle motor control, 33 denotes a read/write circuit, 35 and 36 denote lenses, 37 denotes a beam splitter, 38 denotes a mirror, 39 denotes a quarter-wave plate, 40 denotes a half mirror, 41 denotes a critical angle prism, 42 denotes a moving mechanism, 43 denotes a D/A converter, 44 denotes an addition amplifier, 50 denotes a comparator (voltage comparator), 51 denotes an inverter, 52 and 53 denote AND gates, 54 and 55 denote counters, and 57 denotes a track.

Referring to FIGS. 2 to 5, an optical disk unit will be described.

FIG. 2 shows a configuration of an optical disk unit employed in this embodiment. The optical disk unit comprises a controller 27, a read/write circuit 33, a control unit 19, a servo control unit 30, an $E^2PROM$ 25, an optical pickup 2, an optical disk 1, a spindle motor 5, a light value control 31, a spindle motor control 32, and a magnetic field generator 29.

The optical disk unit is used in connection with a host 28.

The optical pickup 2 and servo control unit 30 are configured, for example, as shown in FIG. 3.

As illustrated, in the optical disk unit of the present invention, a moving mechanism 42 in which the optical pickup 2 is incorporated aligns the optical pickup 2 with an intended track in the radial direction of the optical disk 1 rotated by the spindle motor 5.

In the optical pickup 2, light generated by a semiconductor laser 12 serving as a light source is reduced in diameter by a lens 35, a beam splitter 37, a quarter-wave plate 39, a mirror 38, and an objective lens 7. Then, by irradiating the reduced light onto the optical disk 1, recording or regeneration is carried out. Light reflected from the optical disk 1 is received by the objective lens 7 and mirror 38 via the quarter-wave plate 39 and beam splitter 37, then routed from a half mirror 40 through a lens 36 to a light receiver 11. Then, a regenerative signal RFS is produced. Meanwhile, the reflected light is routed from the half mirror 40 through critical angle prism 41 to a light receiver 10. Then, a tracking error signal TES and a focus error signal FES are produced.

As described previously, in the optical disk unit, numerous tracks or pits are formed at intervals of several microns in the radial direction of the optical disk 1. Even slight eccentricity results in a displacement of a track. Moreover, swelling of the optical disk 1 causes a deviation of a focal point of irradiated light. Nevertheless, the irradiated light of 1 micron or less in diameter must be forced to achieve tracking.

For the tracking, a focus actuator 8 that moves the objective lens 7 of the optical pickup 2 vertically to modify a focal point, and a tracking actuator 6 that moves the objective lens 7 laterally in FIG. 3 to modify an irradiation point in the tracking direction are included. In addition, a focus servo control 4 for receiving a light received signal from the light receiver, generating a focus error signal FES, and driving the focus actuator 8, and a tracking servo control 3 for receiving a light received signal from the light receiver 10, generating a tracking error signal TES, and driving the tracking actuator 6 are included.

FIG. 4 shows examples of configurations of a servo control unit 30 and a control unit 19.

As illustrated, a focus servo control 4 comprises a differential amplifier 14 for generating a focus error signal FES, an offset addition amplifier 15, and a power amplifier 16 for amplifying an output of the offset addition amplifier 15, and driving a focus actuator 8 (See FIG. 3). An offset addition circuit 400 is composed of the offset addition amplifier 15 and the resistors R9, R10 and r5.

The offset addition circuit 400 adds an offset FOS provided by a microprocessor 23, which will be described later, to an output (FES) of the differential amplifier 14.

Outputs a and b of a light receiver 10 are applied to a negative terminal of the differential amplifier 14 via input resistors R3 and R4, while outputs c and d of the light receiver 10 are applied to a positive terminal of the differential amplifier 14 via input resistors R1 and R2. The differential amplifier 14 outputs (−FES) derived from (c+d)−(a+b). r1 denotes a bias resistor, and r2 denotes a feedback resistor.

A tracking servo control 3 has substantially the same configuration as the aforesaid focus servo control 4.

As illustrated, the tracking servo control 3 comprises a differential amplifier 17 for generating a tracking error signal TES, an offset addition amplifier 44, and a power amplifier 18 for amplifying an output of the offset addition amplifier 44 and driving a tracking actuator 6 (See FIG. 3). An addition circuit 300 is composed of the offset addition amplifier 44 and the resistors R11, R12 and r6.

Outputs a and d of the light receiver 10 are applied to a negative terminal of the differential amplifier 17 via input resistors R5 and R6, while outputs b and c of the light receiver 10 are applied to a positive terminal of the differential amplifier 17 via input resistors R7 and R8. The differential amplifier 17 outputs (−TES) derived from (b+c)−(a+d). r3 denotes a bias resistor and r4 denotes a feedback resistor.

A control unit 19 comprises a microprocessor 23, and D/A converters 22 and 43, and is connected to an E²PROM 25 which is a nonvolatile memory.

In the E²PROM 25, as described later, specified data (FOS and TOS) are stored during adjustment (assembly) at a factory. During normal operation, the microprocessor 23 reads data from the E²PROM 25.

An output of the microprocessor 23 is fed to a terminal T1 of the focus servo control 4 via the D/A converter 22 and to a terminal T2 of the tracking servo control 3 via the D/A converter 43. The microprocessor 23 can set a focus offset FOS or a tracking offset TOS.

FIG. 5 shows an example of a duty measurement circuit for use in adjusting an optical disk at a factory.

The duty measurement circuit comprises a comparator (voltage comparator) 50, a resistor R50, an inverter 51, AND gates 52 and 53, and counters 54 and 55.

A negative input terminal of the comparator 50 is connected to a reference power supply having a voltage Vg, and a positive input terminal thereof is connected to a point A in the tracking servo control 3 shown in FIG. 4.

The comparator 50 compares the voltage at the point A with the reference voltage Vg, and outputs the result of the comparison.

The AND gate 52 inputs an output of the comparator 50, and the other AND gate 53 inputs an output of the comparator 50 via the inverter 51.

In this case, each of the two AND gates 52 and 53 inputs a sample clock from an external unit, produces an output signal representing the AND between an output of the comparator 50 and the sample clock, and feeds the output to the counters 54 and 55.

The counter 54 counts up an output of the AND gate 52, and outputs the count. The counter 55 counts up an output of the AND gate 53, and outputs the count. These outputs are used to calculate a duty ratio. In this case, as described later, when N equals to M, the duty ratio is 50%.

Next, referring to FIGS. 6A to 6E, and 7A to 7E, the operation of an optical disk unit will be described.

First, the basic operations of focus servo control and tracking servo control will be described in conjunction with FIGS. 6A to 6E.

Figure 6A:
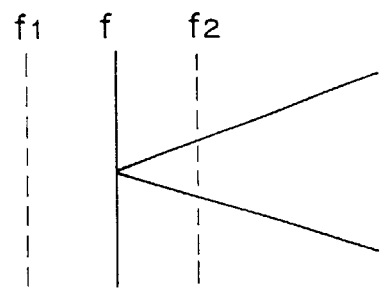
FIGS. 6A to 6E are diagrams illustrating a focus servo control mechanism.

For focus servo control, when a four-division light receiver 10 made up of four elements a, b, c and d is employed, as shown in FIG. 6A, a state in which the focus of irradiated light coincides with the recording surface of an optical disk 1 is regarded as f. States in which the focus deviates back and forth from the recording surface are regarded as $f_1$ and $f_2$ respectively. The distribution of amounts of reflected light entering the light receiver 10 via a critical angle prism 41 becomes as those shown in FIGS. 6B to 6D in these states.

Figure 6B:
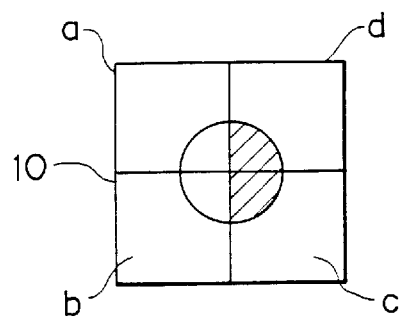
Figure 6C:
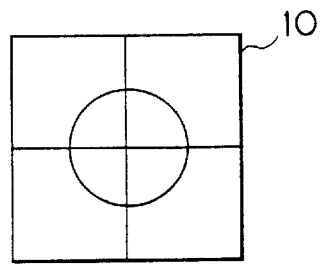
Figure 6D:
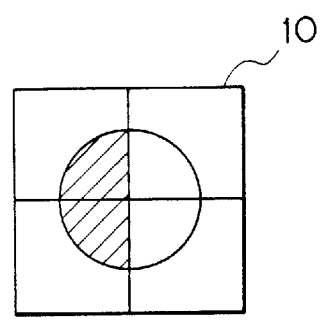
Figure 6E:
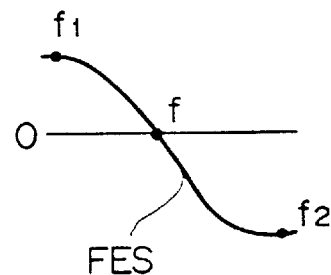

To be more specific, when the focus is in the $f_1$ state, the distribution is as shown in FIG. 6B. When the focus is in the f (matches) state, the distribution is as shown in FIG. 6C. When the focus is in the $f_2$ state, the distribution is as shown in FIG. 6D. A focus servo control 4 receives an output of (a+b)−(c+d) from the light receiver 10, and provides a focus error signal FES. This method is well-known as a critical angle method using the critical angle prism 41.

Therefore, when a focus actuator 8 is driven according to the focus error signal FES and moves an objective lens 7 vertically, despite swelling of the optical disk 1, the focus of irradiated light can be forced to track the recording surface of the optical disk on the submicron order.

Figure 7E:
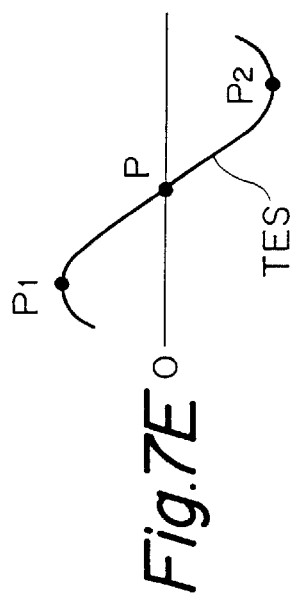
FIGS. 7A to 7E are diagrams illustrating a tracking servo control mechanism.
Figure 7B:
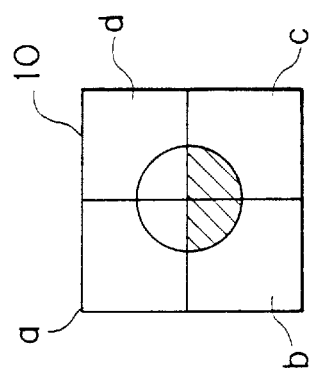
Figure 7C:
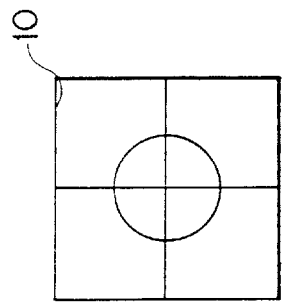
Figure 7D:
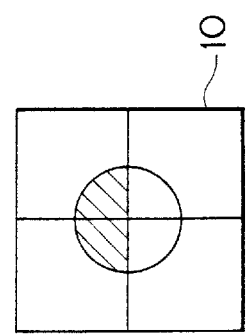
Figure 7A:
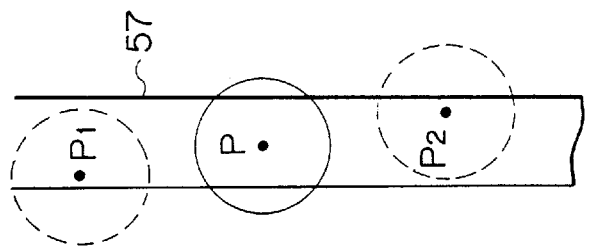

For tracking servo control, as shown in FIG. 7A, the distribution of amounts of reflected light in the light receiver 10 varies according to the interference of light by a track 57 which depends on the position of irradiated light in the track 57.

To be more specific, when irradiated light is in the $P_1$ state on the track 57, the distribution of amounts of reflected light in the light receiver 10 becomes as shown in FIG. 7B. When irradiated light is in the P state (exactly on the track) on the track 57, the distribution becomes as shown in FIG. 7C. When irradiated light is in the $P_2$ state on the track 57, the distribution becomes as shown in FIG. 7D.

A tracking servo control 3 receives an output of (a+d)−(b+c) from the light receiver 10, and provides a tracking error signal TES shown in FIG. 7E. When a tracking actuator 6 is driven to move the objective lens 7 laterally according to the tracking error signal TES, despite eccentricity of the optical disk 1, irradiated light can be forced to follow the track 57 on the optical disk 1.

Next, the process for adjustment at a factory will be described.

When an optical disk unit is adjusted at a factory (during assembly of a product), a focus offset FOS causing the amplitude of a signal at the point A to be maximum is detected by, for example, incrementing or decrementing a focus offset while observing a point A in a tricking servo control 3. Then, the detected FOS values are written in an area in an E²PROM 25.

A tracking offset TOS causing the signal at the point A to swing with 0V as a center is detected by incrementing or decrementing a tracking offset while observing the point A. Then, the detected TOS value is written in an area in the E²PROM 25.

The processing for the above detection of the first embodiment will be described with reference to FIGS. 8 and 9.

First, at a step 201, the power supply is turned on to supply power to an optical disk unit. At a step 202, a spindle motor 5 is rotated.

A semiconductor laser (laser diode LD) serving as a light source 12 is lit at a step 203. At a step 204, an optical pickup is focused by actuating a focus servo.

Thereafter, at step 205, an oscilloscope is connected to a point A in a tracking servo control shown in FIG. 4. Thereby, the voltage wave at the point A is observed.

Then, at steps 206 and 207, a command indicating that a focus offset FOS should be incremented (+1) or decremented (−1) is issued to a microprocessor 23 at an external unit,.

In response to the command, the microprocessor 23 increments or decrements the focus offset FOS and updates a set value in a D/A converter 22.

Specifically, the microprocessor 23 varies the focus offset FOS until the wave at the point A has a maximum amplitude.

Then, when a focus offset FOS causing the amplitude of the wave to be maximum is detected, since the FOS value allows the focus to coincide with the recording surface of an optical disk 1, a command indicating that the focus offset value should be written in the E²PROM 25 is issued to the microprocessor 23 at the external unit.

In response to the command, the microprocessor 23 writes the FOS focus offset value (value entered at the external unit) in the E²PROM 25 at a step 208.

At steps 209 to 213, a command indicating that a tracking offset TOS should be incremented or decremented is issued to the microprocessor 23 at the external unit, so that the wave at the point A will swing vertically symmetrically with respect to a reference voltage Vg.

In response to the command, the microprocessor 23 increments or decrements the tracking offset TOS and updates a value set in the D/A converter 43.

When a tracking offset TOS causing the wave at the point A to swing vertically symmetrically with respect to the reference voltage Vg is detected, a command indicating that the TOS value should be written is issued to the microprocessor 23 at the external unit.

In response to the command, the microprocessor 23 writes the TOS tracking offset value in the E²PROM 25 at a step 211.

Figure 10:
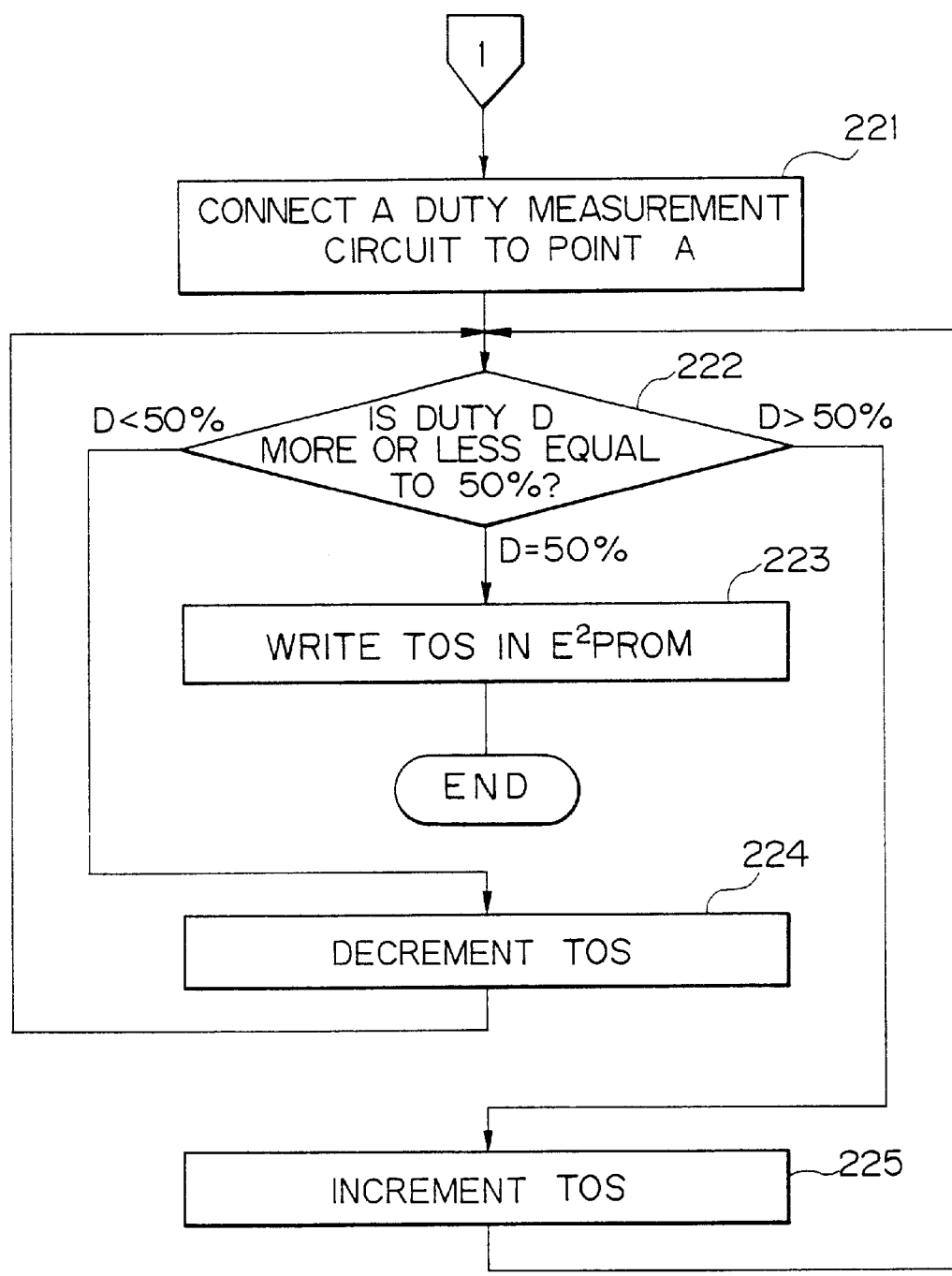
FIG. 10 is a flowchart showing an operation for setting offset of a tracking servo control portion when this servo control apparatus is adjusted in a factory in the second embodiment.

When the tracking offset is zero, the tracking error signal becomes symmetrical opposite to a level corresponding to a center position of the track. Therefore, in the aforesaid procedure of detecting a tracking offset of the first embodiment, a tracking offset value causing a tracking error signal to swing symmetrically with respect to the reference voltage Vg is detected. FIG. 10 shows the processing for detecting the tracking offset in the second embodiment.

In this process, a duty measurement circuit, for example, shown in FIG. 5 is used. In this case, a tracking offset TOS causing a duty ratio of a signal resulting from the comparison between the signal at the point A and the reference voltage Vg to go to 50% is detected.

Figure 8:
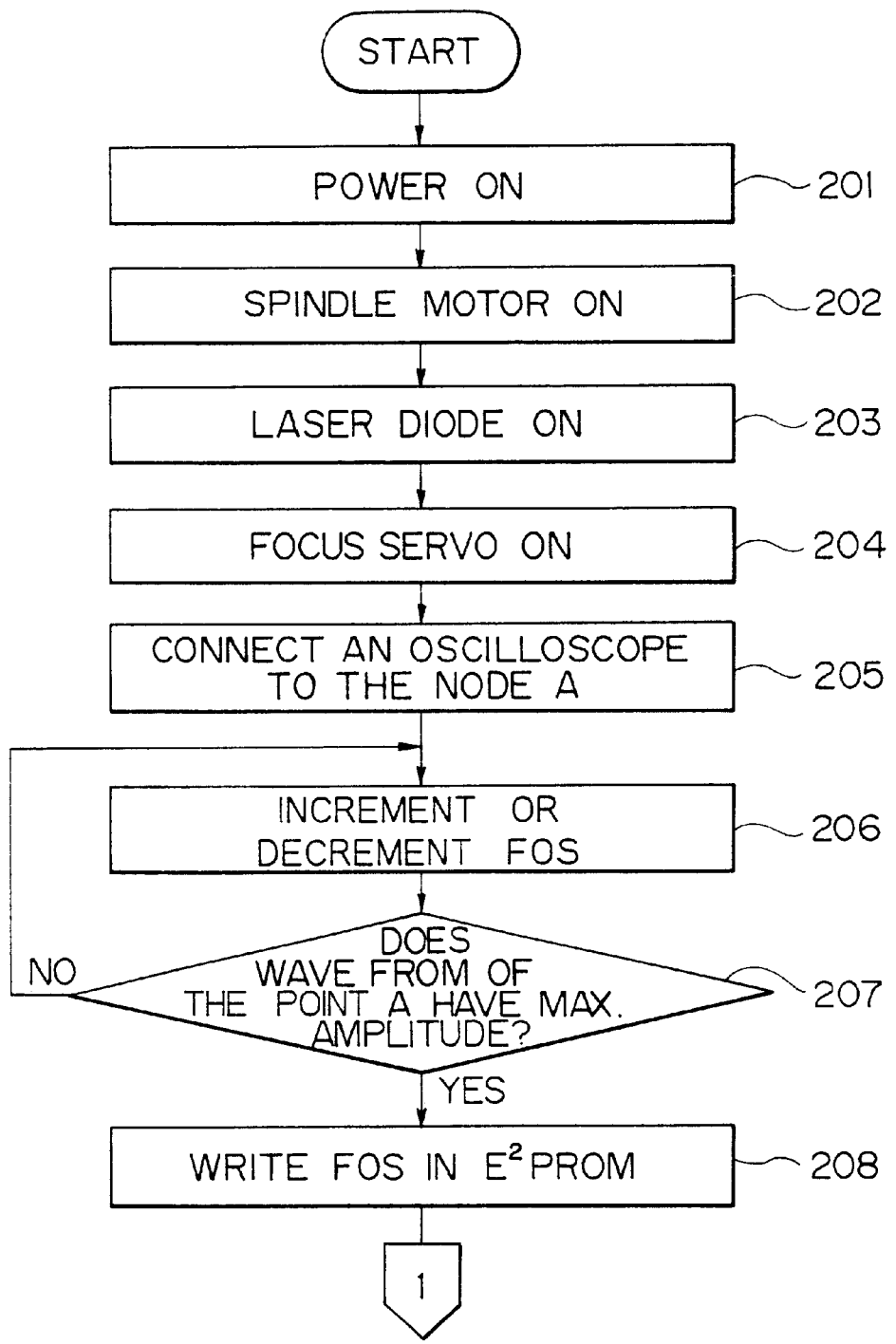
FIGS. 8 and 9 are flowcharts showing an operation for setting offsets of a focus servo control portion and a tracking servo control portion when this servo control apparatus is adjusted in a factory in the first embodiment.

After the operation of the step 208 in FIG. 8, an operation for connecting a duty measurement circuit to the point A is performed at a step 221.

Then, a duty ratio D is checked at a step 222. If the duty ratio D is larger than 50%, the tracking offset TOS is decremented at a step 224. If D is smaller than 50%, the tracking offset TOS is incremented to be 50% at a step 225.

When D becomes equal to 50%, the offset value is detected and written in the E²PROM 25 at a step 223.

The aforesaid processing is achieved by, for example, connecting one of the input terminals of a comparator (voltage comparator) 50 shown in FIG. 5 to the point A and the other one of the input terminals to the reference voltage Vg.

If the voltage at the point A is higher than the reference voltage Vg, an output of the comparator 50 is a high-level signal. If the voltage is lower, the output signal is low.

Assuming that the period in which the output of comparator 50 is high is N and the period in which the output thereof is low is M, when N equals M, the duty ratio is 50%. When N is smaller than M, the duty ratio is less than 50%.

Next, the third embodiment in which the focus offset FOS and tracking offset TOS are detected by an other method will be described with reference to FIGS. 11 and 12.

In this embodiment, a focus offset FOS or a tracking offset TOS causing an information regenerative signal RFS to have a maximum level is detected.

First, the power supply is turned on at a step 231. A spindle motor 5 is rotated at a step 232. A light source (LD) 12 is lit at a step 233.

Thereafter, a servo focus and a tracking servo, are actuated at a step 234. At a step 235, an oscilloscope is used to observe an information regenerative signal RFS produced by an optical pickup.

Then, at steps 236 and 237, a focus offset FOS is varied until the information regenerative signal RFS has a maximum level. When the information regenerative signal RFS has a maximum level, the FOS focus offset value is detected and written in an E²PROM 25 at a step 238.

Next, a tracking offset TOS is varied at steps 239 to 241. While observing the oscilloscope, the level of the information regenerative signal RFS is increased to a maximum.

When the information regenerative signal RFS has a maximum level, the TOS tracking offset value is detected and written in the E²PROM 25 at a step 242.

As described above, a focus offset FOS and a tracking offset TOS are written in the E²PROM 25. The process for detecting the tracking offset TOS shown in FIGS. 9, 10, and 12 can be combined with either of the processes for detecting the focus offset FOS shown in FIGS. 8 and 11.

Figure 9:
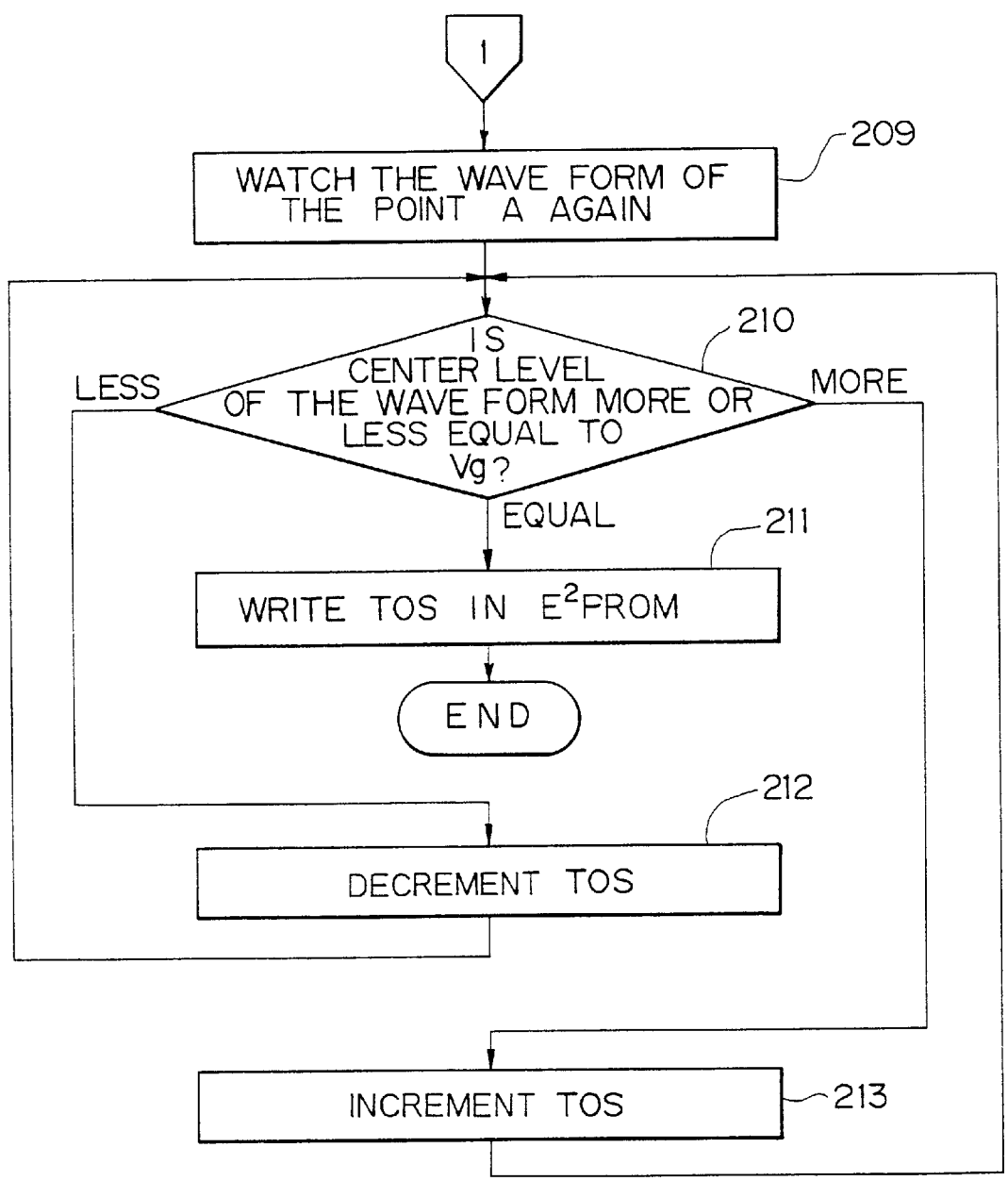
Figure 11:
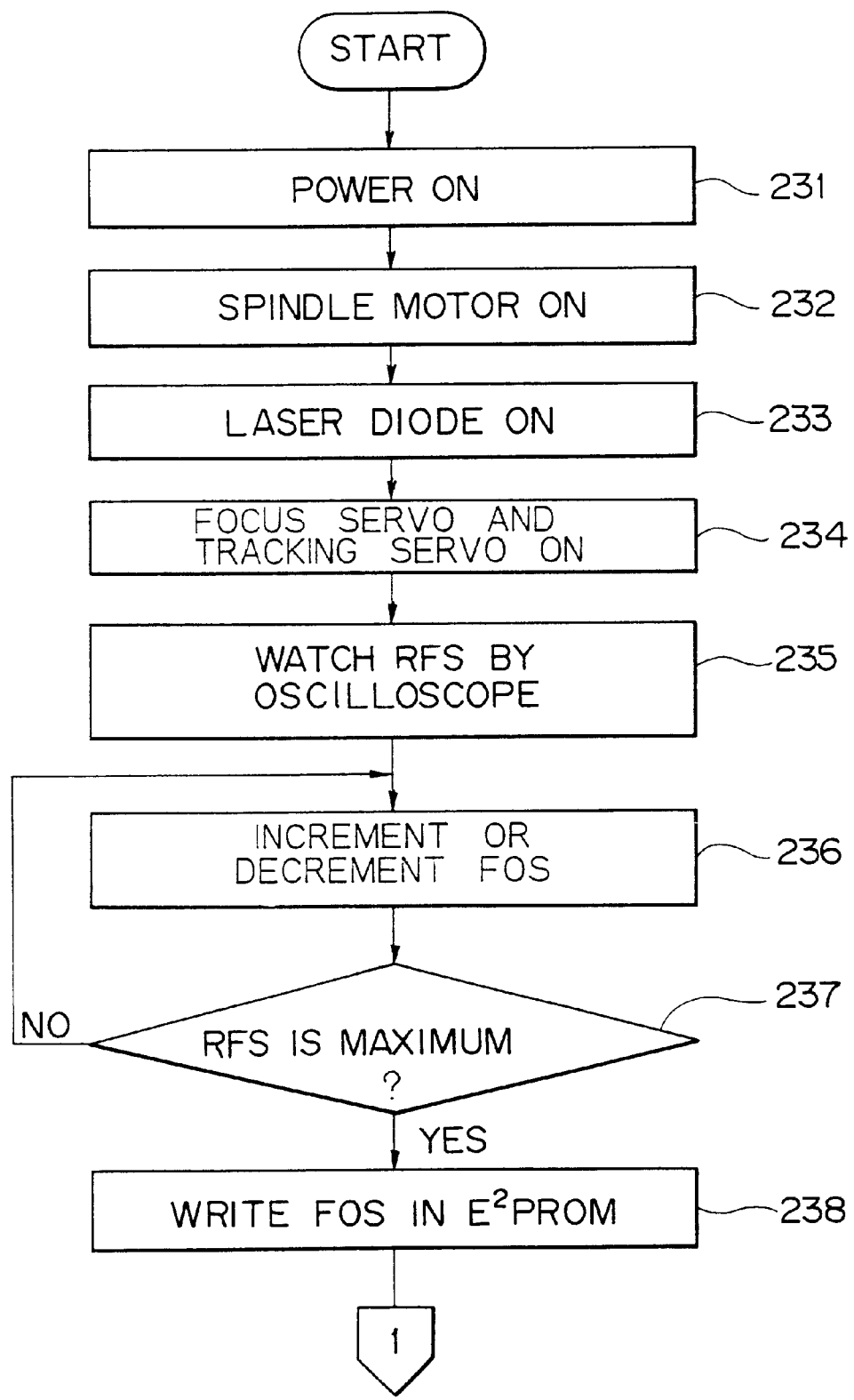
FIGS. 11 and 12 are flowcharts showing an operation for setting offsets of a focus servo control portion and a tracking servo control portion when this servo control apparatus is adjusted in a factory in a third embodiment.

For instance, the process shown in FIG. 9 or 10 may be preceded by the process shown in FIG. 11. The process shown in FIG. 12 may be preceded by the process shown in FIG. 8.

Of these processes, the process for detecting a tracking offset TOS will be described in more detail with reference to FIGS. 13 and 14.

For example, in the process shown in FIG. 10, a duty measurement circuit shown in FIG. 5 is used to set a duty ratio of 50%. FIG. 13 shows a procedure of detecting an offset using the duty ratio.

In this procedure, a point A in a tracking servo control circuit 3 shown in FIG. 4 is connected to an input terminal of a comparator (voltage comparator) 50 shown in FIG. 5. Then, the voltage at the point A is compared with a reference voltage Vg. Vth in FIG. 13 denotes a mean value of levels of a tracking error signal.

Output pulses resulting from the comparison of the wave at the point A with the reference voltage Vg are as shown in FIG. 13. Assuming that the pulse width is t1 and the time interval from a trailing edge of a pulse to a leading edge of the next pulse is t2, the duty ratio varies depending on a change in an offset (TOS). Consequently, the pulse width t1 and time interval t2 (corresponding to N and M in FIG. 5) varies.

When the duty ratio is 50% (no offset), t1=t2. When the duty ratio is less than 50%, t1<t2. Based on these relationships, an offset (TOS) providing a duty ratio of 50% can be detected.

The process for detecting a tracking offset while observing a wave on an oscilloscope connected to a point A (for example, the process shown in FIG. 9) is based on the technique shown in FIG. 14.

Specifically, the wave at the point A is compared with a reference voltage Vg. When the wave swings above from Vg, an area S1 results. When the wave swings below from Vg, an area S2 ensues. When S1 equals to S2 (the wave becomes vertically symmetric), an offset (TOS) is calculated.

Normal operation of an optical disk unit performed when a user uses the optical disk unit in which a focus offset FOS and a tracking offset TOS are placed in an E²PROM 25 as described above will be described with reference to FIG. 15.

The subsequent description will be based on the flowchart of FIG. 15.

First, the power supply is turned on at a step 251. Then, a microprocessor 23 reads a focus offset FOS from an E²PROM 25 at a step 252, and sets the value in a D/A converter 22 at a step 253.

Next, the microprocessor 23 reads a tracking offset TOS from the E²PROM 25 at a step 254, and sets the value in a D/A converter 43 at a step 255.

Then, a spindle motor 5 is rotated at a step 256, and a light source (laser diode LD) 12 is lit at a step 257. A focus servo is actuated at a step 258, and a tracking servo is actuated at a step 259. Then, the optical disk unit gets ready to operate.

Next, the fourth embodiment in which the present invention is implemented in the gain control performed by a focus servo control 4 and a tracking servo control 3 will be described.

The fourth embodiment is also an optical disk unit, having the same construction as shown in FIGS. 1 to 3. In the drawings referenced hereinafter, components identical to those in FIGS. 1 to 3 will bear the same numerals, and the description thereof will be omitted.

Figure 16:
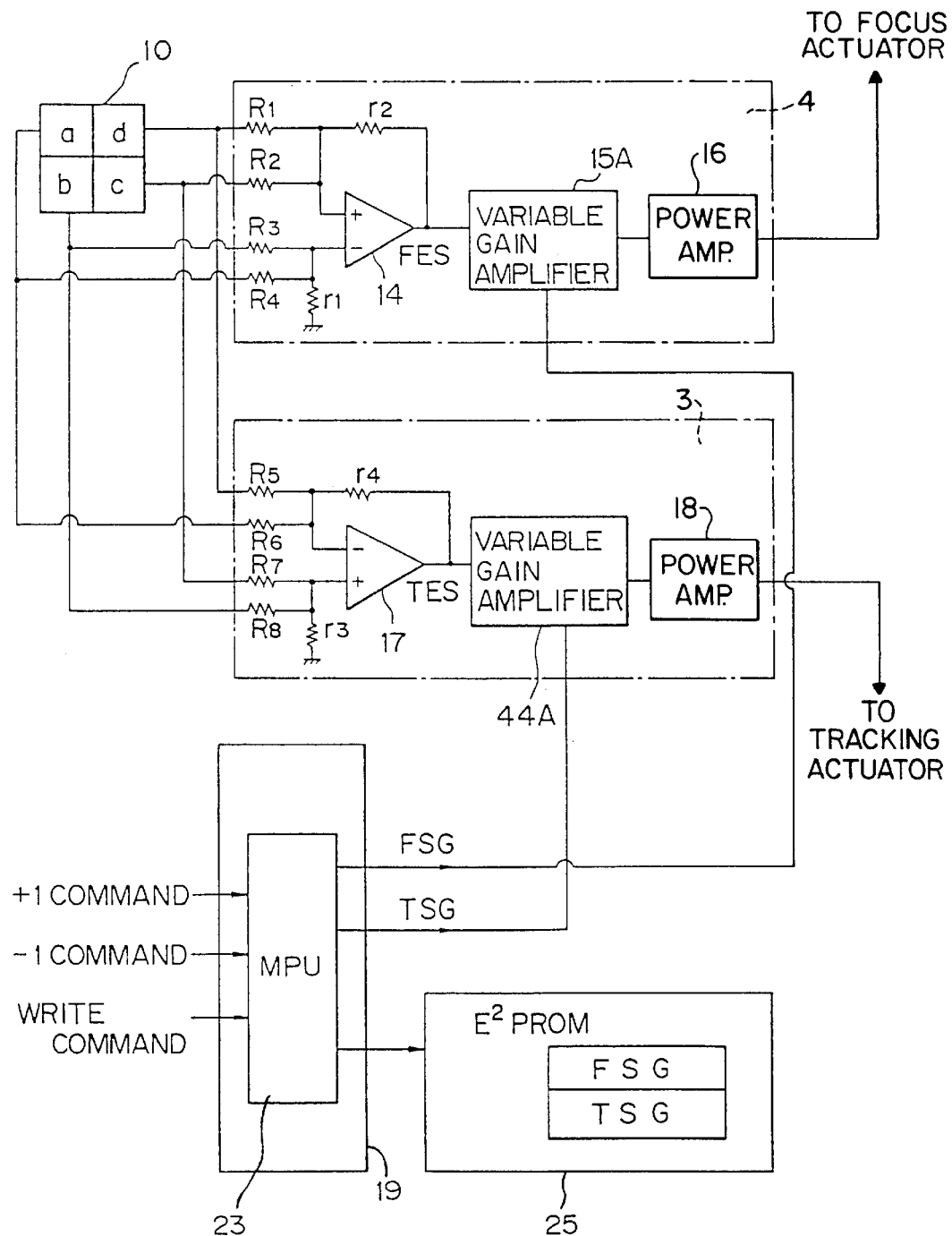
FIG. 16 is a diagram showing a construction of a servo control portion and a control portion of a fourth embodiment.
Figure 17:
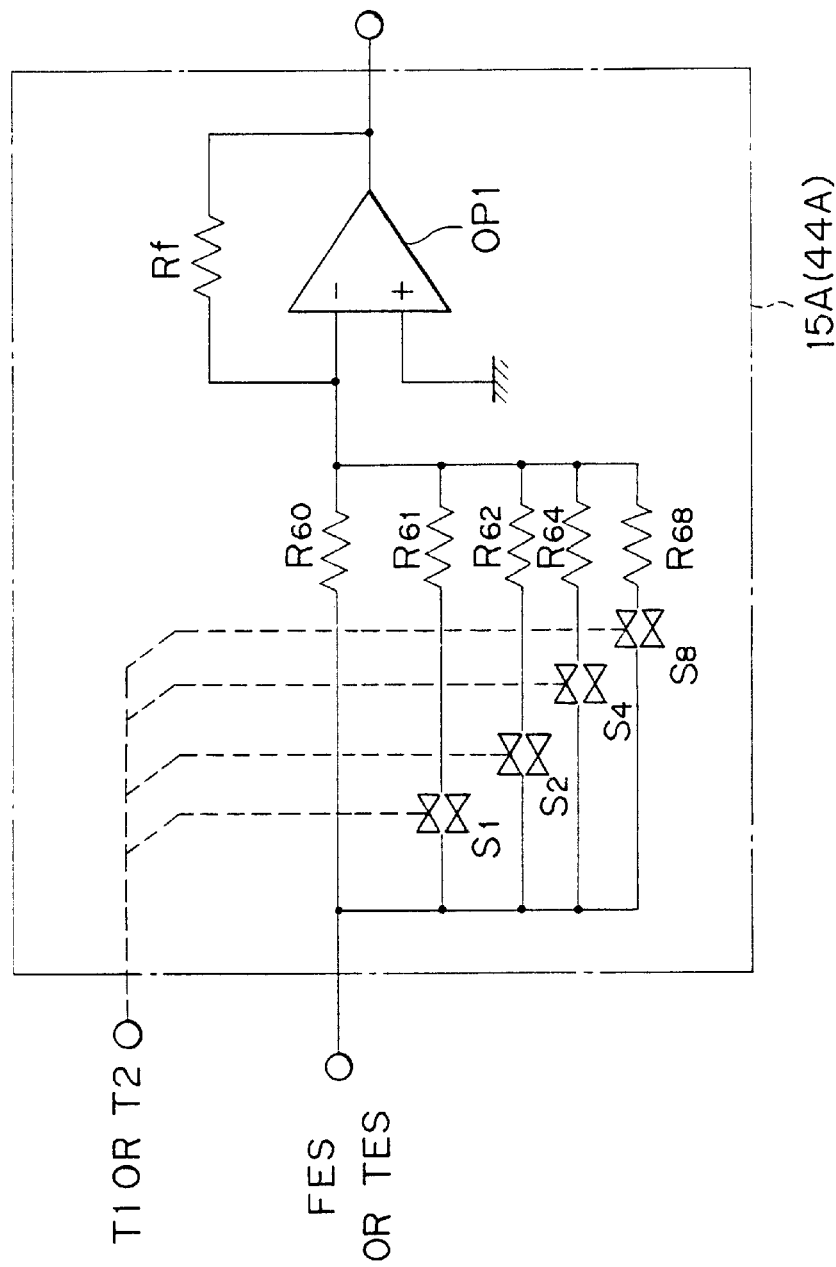
FIG. 17 is a circuit diagram showing an example of a variable gain amplifier of FIG. 16.
Figure 18:
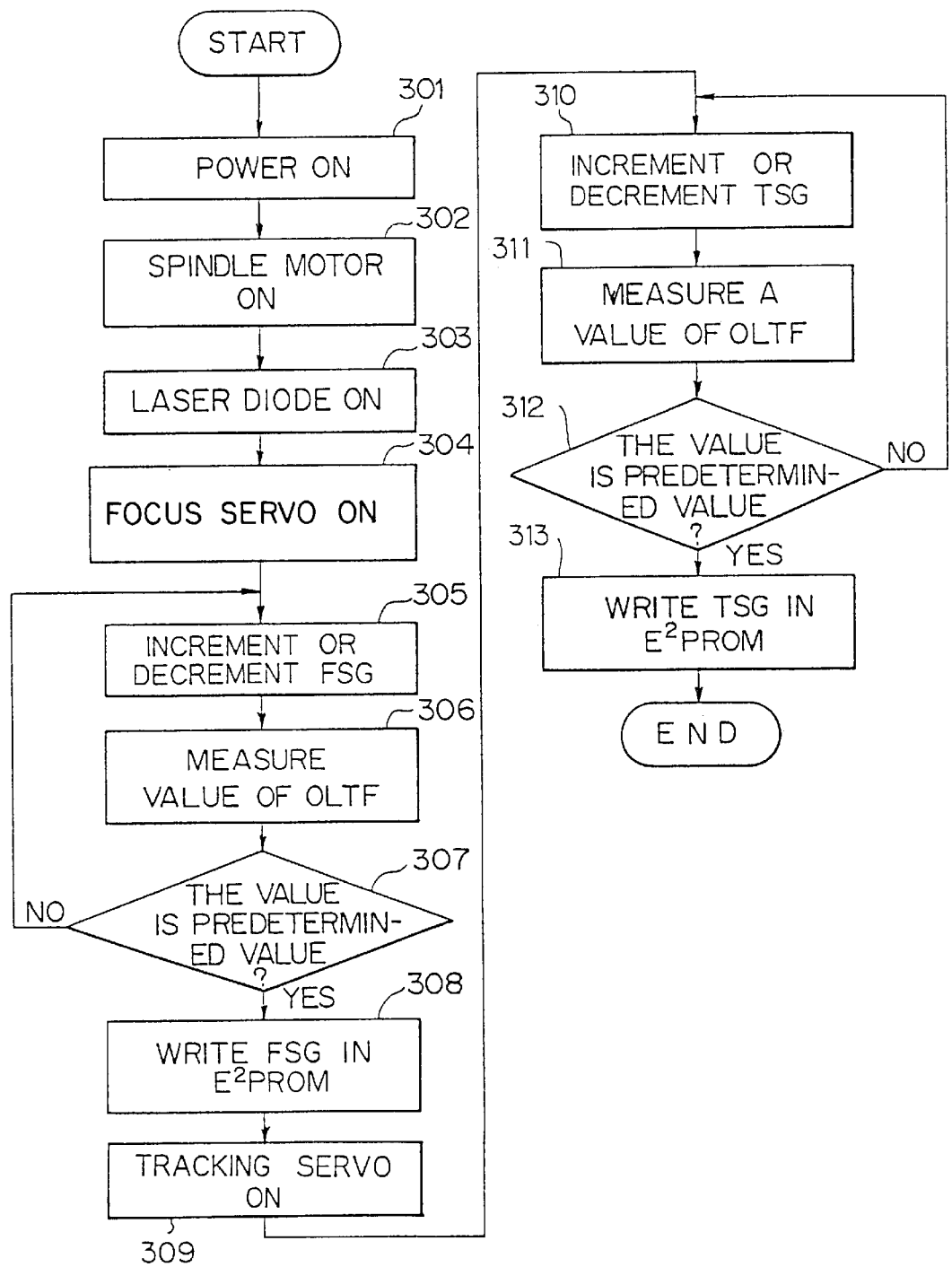
FIG. 18 is a flowchart showing an operation for setting gains of a focus servo control portion and a tracking servo control portion when this apparatus is adjusted in a factory in the fourth embodiment.
Figure 19:
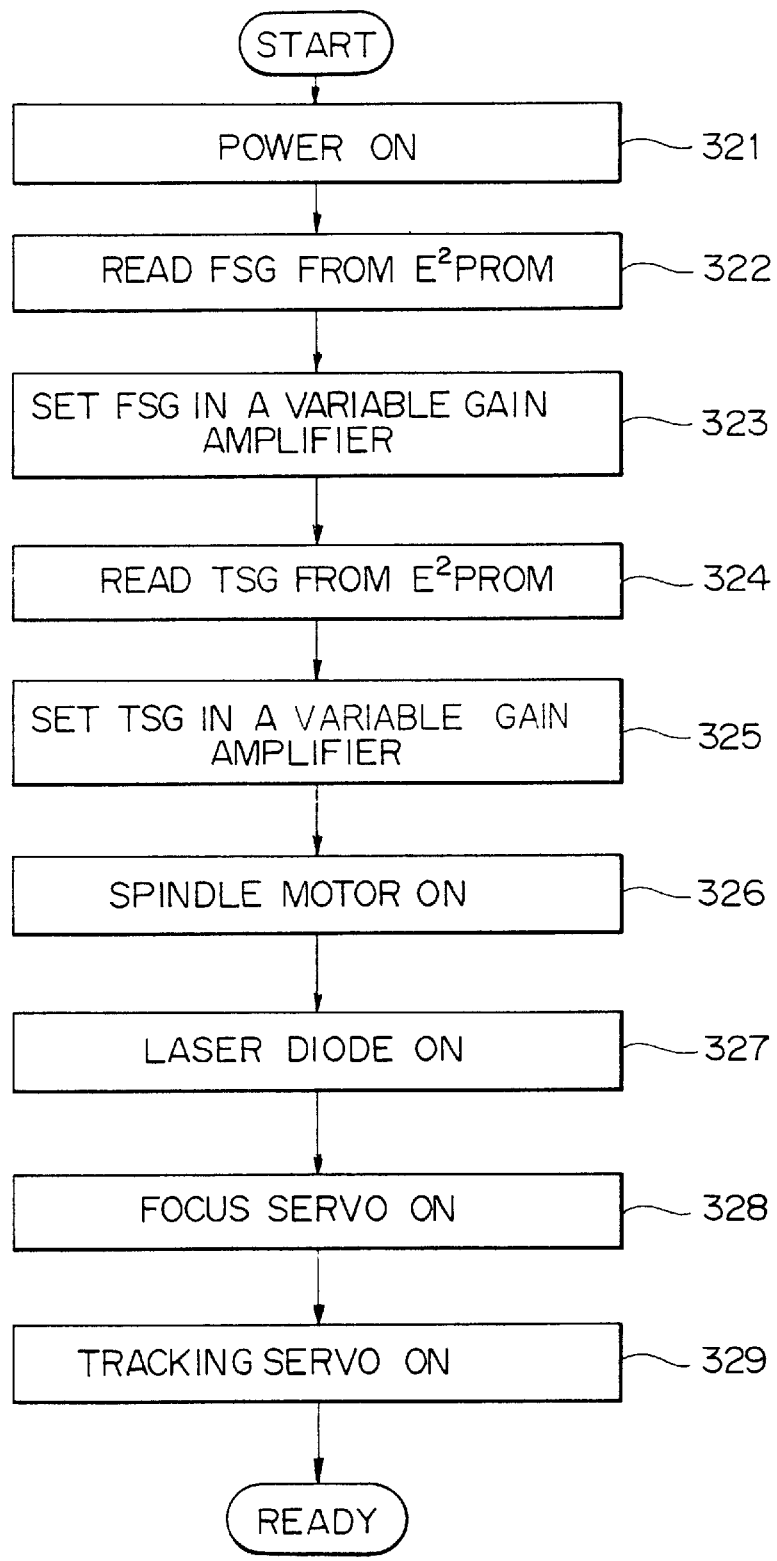
FIG. 19 is a flowchart showing an operation for setting the gain values stored in an $E^2PROM$ in the servo control portion when this apparatus is powered ON in the fourth embodiment.

FIG. 16 shows examples of configurations of a servo control unit and a control unit in the fourth embodiment. FIG. 17 shows an example of a configuration of a variable gain amplifier. FIG. 18 is a flowchart of the process for adjustment at a factory. FIG. 19 is a flowchart of the process for normal operation.

In the drawings, 15A and 44A denote variable gain amplifiers, R60, R61, R62, R64, and R68 denote resistors, S1 to S8 denote analog switches, and Rf denotes a feedback resistor.

FIG. 16 shows examples of configurations of a servo control unit 30 and a control unit 19 in the fourth embodiment. Differences from the configurations shown in FIG. 4 are that variable gain amplifiers 15A and 44A substitute for an addition circuit made up of amplifiers 15 and 44, and their gains can be controlled by a control unit 19, and that in an $E^2PROM$ 25 are placed the gain data FSG and TSG.

FIG. 17 shows an example of a configuration of a variable gain amplifier 15A for a focus servo control 4 or a variable gain amplifier 44A for a tracking servo control 3 shown in FIG. 16.

The variable gain amplifier 15A or 44A comprises an operational amplifier OP1, a feedback resistor Rf, analog switches S1 to S8, and resistors R60, R61, R62, R64, and R68.

The analog switches S1 to S8 are turned on or off with a signal sent from a microprocessor 23 (See FIG. 4). When the analog switches S1 to S8 are all off, only the resistor R60 is connected to a negative input terminal of the operational amplifier. If any of the analog switches is turned on, a resistor connected in series with the analog switch which has been turned on is connected in parallel with the resistor R60.

Therefore, when the analog switches S1 to S8 are turned on or off with a signal from the microprocessor 23, an input resistance of the operational amplifier Op1 varies. Thus, the gain of the variable gain amplifier can be varied.

Next, the process for setting a gain of a servo control in the process of adjustment of an optical disk unit at a factory will be described.

When an optical disk unit is adjusted at a factory (during assembly of a product), an open-loop transfer function for a focus servo and a tracking servo is calculated to provide a total servo gain. Then, a focus servo gain (FSG) and a tracking servo gain (TSG), which cause the open-loop transfer function to provide a specified value of a total servo gain, are detected and written in an area of an $E^2PROM$ 25.

The above process will be described in conjunction with FIG. 18.

In this process, the power supply is turned on at a step 301 to supply power to an optical disk unit. A spindle motor 5 is rotated at a step 302. A semiconductor laser (laser diode LD) serving as a light source 12 is lit at a step 303.

Thereafter, a focus servo is actuated under the control of a focus servo control 4 at a step 304.

Next, a command indicating that FSG should be incremented or decremented is issued to a microprocessor 23 shown in FIG. 16 at an external unit, so that the open-loop transfer function for the focus servo will provide a specified value. In response to the command, the microprocessor 23 increments or decrements FSG to modify the gain for a variable gain amplifier 15A.

Thus, FSG is varied at steps 305 to 307. The value provided by the open-loop transfer function is observed using a signal analyzer or any other measuring instrument. The above procedure is repeated until the open-loop transfer function provides a specified value.

When FSG causing the open-loop transfer function to provide a specified value is determined, a command indicating that the FSG value should be written in the $E^2PROM$ 25 will be issued to the microprocessor 23 at the external unit.

In response to the command, the microprocessor 23 writes the FSG value in the $E^2PROM$ 25 at a step 308.

Next, a tracking servo is actuated under the control of a tracking servo control 3 at a step 309, and a command indicating that TSG should be incremented or decremented is issued to the microprocessor 23 at the external unit, so that the open-loop transfer function defining the tracking servo under the control of a tracking servo control 3 will provide a specified value.

In response to the command, the microprocessor 23 increments or decrements TSG to vary the gain for a variable gain amplifier 44A.

Thus, TSG is varied at steps 310 to 312. The value provided by the open-loop transfer function is observed using a measuring instruction. The above procedure is repeated until the open-loop transfer function provides a specified value.

When a TSG value causing the open-loop transfer function to provide a specified value is determined, a command indicating that the TSG value should be written in the $E^2PROM$ 25 is issued to the microprocessor 23 at the external unit.

In response to the command, the microprocessor 23 writes the TSG data entered at the external unit in the $E^2PROM$ 25 at step 313.

Normally (when an optical disk unit is operated at a user's location after being delivered from a factory), for example, when the power supply of the optical disk unit is turned on to set up the optical disk unit, the microprocessor 23 reads data from the $E^2PROM$ 25, and sets gains for the gain amplifiers 15A and 44A in the focus servo control 4 and tracking servo control 3, respectively.

The aforesaid process will be described in conjunction with the flowchart of FIG. 19.

First, the power supply is turned on at step 321 to supply power to an optical disk unit. Thereafter, a microprocessor 23 in a control unit 19 reads FSG from an $E^2PROM$ 25 at step 322, and sets the read FSG value in a variable gain amplifier 15A in a focus servo control 4 at step 323.

The microprocessor 23 reads the TSG value from the $E^2PROM$ 25 at step 324, and sets the TSG value for a variable gain amplifier 44A in a tracking servo control 3.

Then, a spindle motor 5 is rotated at step 326, and a semiconductor laser (laser diode) serving as a light source 12 is lit at step 327.

Next, a focus servo is actuated at a step 328, and a tracking servo is actuated at step 329. Thus, the optical disk unit is prepared to operate.

Thereafter, data read or data write is executed normally during focus servo control and tracking servo control.

Next, other procedure for setting gains will be presented in the fifth embodiment.

Figure 20:
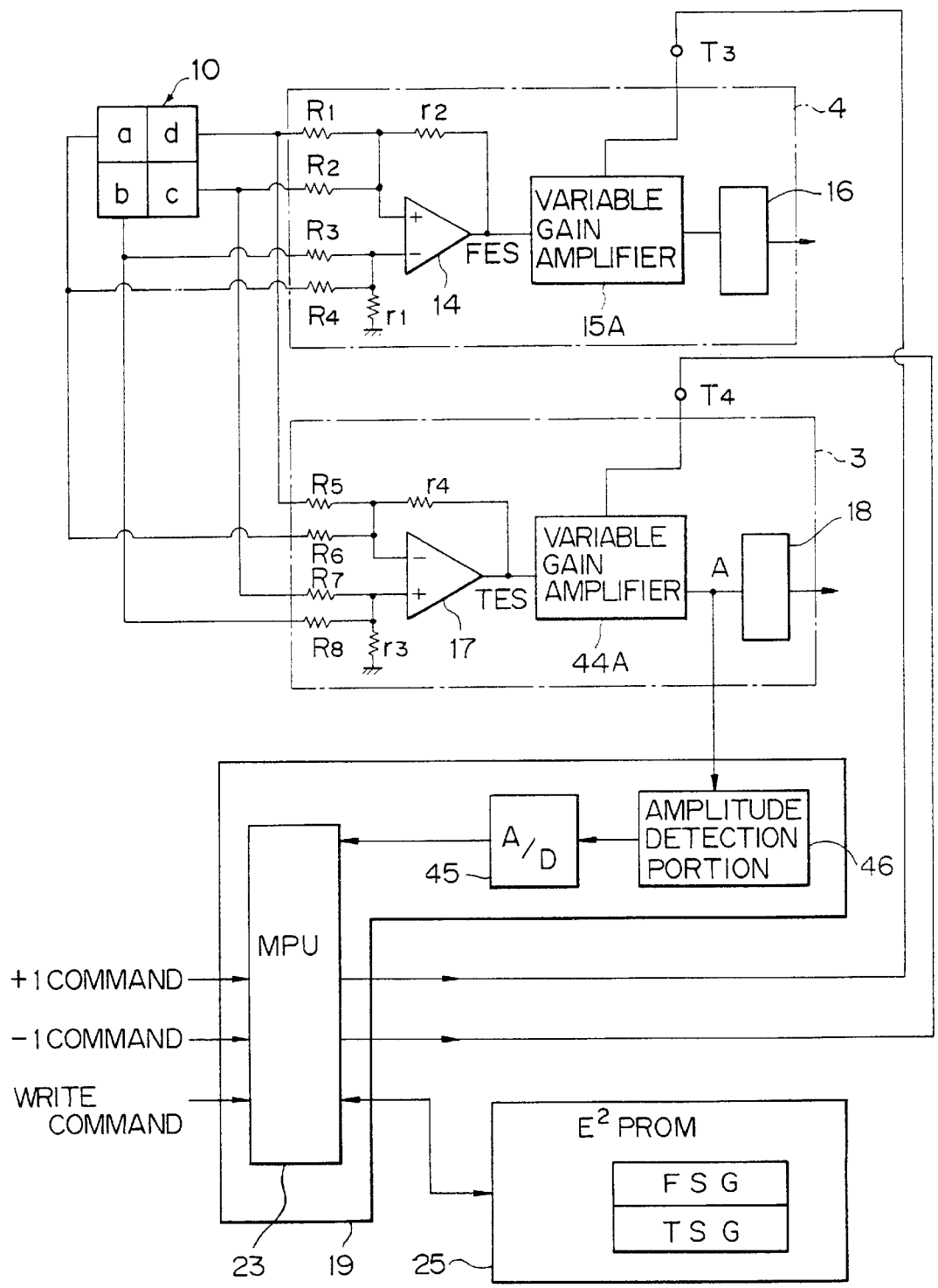
FIG. 20 is a diagram showing a construction of a servo control portion and a control portion of a fifth embodiment.
Figure 21:
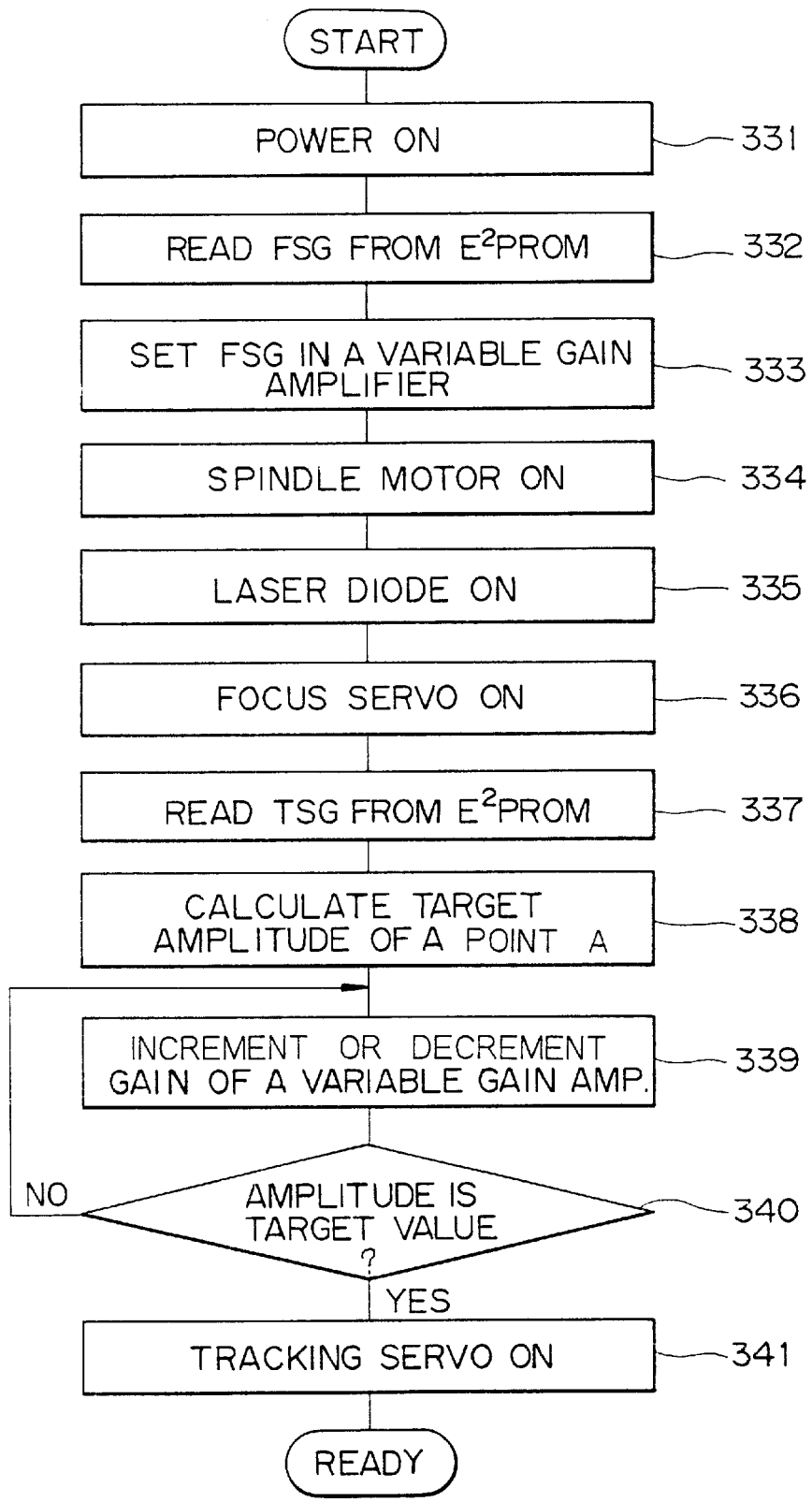
FIG. 21 is a flowchart showing an operation for setting the gain value stored in an $E^2PROM$ and a gain value calculated from the gain value stored in the $E^2PROM$ in the servo control portion when this apparatus is powered ON in the fifth embodiment.

FIGS. 20 and 21 show the fifth embodiment of the present invention. Numerals 45 denotes an A/D converter, and 46 denotes an amplitude detector.

FIG. 20 shows configurations of a servo control unit 30 and a control unit 19 in the fifth embodiment.

In this embodiment, the configurations of a focus servo control 4 and tracking servo control 3, which are installed in the servo control unit 30, are identical to those in the fourth embodiment shown in FIG. 16. The configuration of the control unit 19 differs from that in the fourth embodiment.

Specifically, the control unit 19 includes not only a microprocessor 23 but also an A/D converter 45 and an amplitude detector 46.

The amplitude detector 46 is connected to a point A linking up with an output terminal of a variable gain amplifier 44A in the tracking servo control 3.

Then, the amplitude (voltage value) of a tracking error signal TES at the output terminal of the variable gain amplifier 44A is detected. The detected amplitude value is converted into a digital signal by the A/D converter 45, and then applied to the microprocessor 23.

The microprocessor 23 uses the amplitude data and a gain read from an $E^2PROM$ 25 to set a gain (TSG) in the variable gain amplifier 44A.

The process for operating the optical disk unit in which gains are set as described above will be described with reference to FIG. 21.

In the fifth embodiment, the procedure until FSG and TSG are written in the $E^2PROM$ 25 is identical to that in the fourth embodiment.

With FSG and TSG written in the $E^2PROM$ 25, normal operation is carried out. Referring to the flowchart of FIG. 21, the process for normal operation in the fifth embodiment will be described.

First, the power supply is turned on to supply power to an optical disk unit at a step 331. Thereafter, a microprocessor 23 in a control unit 19 reads FSG from an $E^2PROM$ 25 at a step 332. Then, the microprocessor 23 determines a gain and sets the determined gain for a variable gain amplifier 15A in a focus servo control 4.

Next, a spindle motor 5 is rotated. A light source (laser diode LD) 12 is lit at a step 335. A focus servo is actuated under the control of the focus servo control 4 at a step 336.

Thereafter, the microprocessor 23 in the control unit 19 reads TSG from the $E^2PROM$ 25 at step 337. Then, the microprocessor 23 multiplies a standard value of a tracking error signal by a deviation of the TSG value from a standard value at a step 338, and recognizes the product as a target value.

Then, the microprocessor 23 varies the gain value set for a variable gain amplifier 44A in a tracking servo control 3 at steps 339 and 340, so that the amplitude of a signal at the point A linking up with the output terminal of the variable gain amplifier 44A will be equal to the target value.

For example, the standard value of TSG is 1, the standard amplitude value of the tracking error signal TES (output signal of a differential amplifier 17) is 500 mV.

If a TSG value read from the $E^2PROM$ 25 is 1.3, the target value will be 500×1.3=650 (mV).

The variable gain amplifier 44A is set up so that the amplitude of the signal at the point A will be 650 mV.

Thereafter, a tracking servo is actuated at a step 341. Thus, the optical disk unit is prepared to operate.

The "standard value of TSG" and "standard amplitude value of a tracking error signal" are values that have been calculated in the process of designing the optical disk unit and are programmed in the control unit 19.

The "deviation from the standard value of TSG" is calculated by computing a value read from the $E^2PROM$ and the "standard value of TSG." In the above example (of numerical values), since the standard value of TSG is set to 1, the "deviation from the standard value of TSG" is also 1 or equal to the standard value of TSG.

Embodiments have been described so far. The present invention can be implemented in the following modes:

(1) A controller 27 in FIG. 2 may be independent of an optical disk unit and placed between a host 28 and an optical disk unit.

(2) An $E^2PROM$ 25 may be replaced with any other nonvolatile memory.

(3) The present invention can apply to an optical disk unit having a construction different from those of the aforesaid embodiments.

As described above, the present invention provides the following advantages:

(1) Variable resistors or other sliding parts need not be included in a circuit such as a focus servo control or a tracking servo control.

This results in stable focus servo control or tracking servo control irrelevant of an environmental change or a lapse of time.

(2) When an optical system is replaced, all that should be done is to write set values of gains specific to a new optical system in a nonvolatile memory. Thereafter, focus servo control or tracking servo control can be performed according to a specified one-loop transfer function all the time.

(3) Circuits for servo control (for example, an envelope detector or an A/D converter) are unnecessary. Therefore, the number of parts decreases by the number of the circuits. Eventually, downsizing and cost saving can be accomplished.

(4) During normal operation, servo control need not be done. This results in short operation wait time.

What is claimed is:

1. An optical servo control apparatus in an optical storage apparatus comprising:

a tracking servo control portion adapted to maintain an optical pickup at a predetermined position on a recording surface of an optical information storage medium based on a tracking error signal which drives a tracking actuator;

a nonvolatile memory portion storing a servo gain of said tracking servo control portion, said servo gain being measured and stored through use of an external measurement system in a factory; and a setting portion for receiving said servo gain stored in said nonvolatile memory portion to calculate a target value and to set the amplitude of the output of said tracking servo control portion to said target value when a power supply to the optical storage apparatus is turned on.

2. An optical servo control apparatus as set forth in claim 1, further comprising:

a focus servo control portion adapted to maintain an optical pickup at a predetermined focus position opposite said recording surface based on a focus error signal which drives a focus actuator;

a focus nonvolatile memory portion storing a focus servo gain of said focus servo control portion, said focus servo gain being measured and stored through use of an external measurement system in said factory; and a focus setting portion for receiving said focus servo gain stored in said focus nonvolatile memory portion when said power supply is turned on to set said focus servo control portion with said focus servo gain.

3. An optical storage apparatus with an optical servo control apparatus comprising:

a tracking actuator for moving an optical pickup;

a tracking servo control portion adapted to maintain an optical pickup at a predetermined position on a recording surface of an optical information storage medium based on a tracking error signal which drives said tracking actuator;

a nonvolatile, memory portion storing a servo gain of said tracking servo control portion, said servo gain being measured and stored through use of an external measurement system in a factory; and a setting potion for receiving said servo gain stored in said nonvolatile memory portion to calculate a target value and to set the amplitude of the output of said tracking servo control portion to said target value when a power supply to the optical storage apparatus is turned on.

4. An optical storage apparatus as set forth in claim 3, further comprising:

a focus servo control portion adapted to maintain an optical pickup at a predetermined focus position opposite said recording surface based on a focus error signal which drives a focus actuator:

a focus nonvolatile memory portion storing a focus servo gain of said focus servo control portion, said focus servo gain being measured and stored through use of an external measurement system in said factory; and a focus setting portion for receiving said focus servo gain stored in said focus nonvolatile memory portion when said power supply is turned on to set said focus servo control portion with said focus servo gain.

5. An optical servo control apparatus in an optical storage apparatus comprising:

a focus servo control potion adapted to maintain an optical pickup at a predetermined focus position opposite a recording surface of an optical storage medium based on a focus error signal which drives a focus actuator;

a nonvolatile memory portion storing a single focus servo gain for said focus servo control portion, said focus servo gain being measured and stored through use of an external measurement system in a factory; and a focus setting portion for receiving said focus servo gain stored in said focus nonvolatile memory portion to directly set said focus servo control portion with said focus servo gain without further calculation, when a power supply to the optical storage apparatus is turned on.

6. An optical storage apparatus with an optical servo control apparatus comprising:

a focus actuator for moving an optical pickup;

a focus servo control portion adapted to maintain an optical pickup at a predetermined focus position opposite a recording surface of an optical storage medium based on a focus error signal which drives a focus actuator;

a nonvolatile memory portion storing a single focus servo gain for said focus servo control portion, said focus servo gain being measured and stored through use of an external measurement system in a factory; and a focus setting portion for receiving said focus servo gain stored in said focus nonvolatile memory portion to directly set said focus servo control portion with said focus servo gain without further calculation, when a power supply to the optical storage apparatus is turned on.

* * * * *